US005561526A

United States Patent [19]
Huber et al.

[11] Patent Number: 5,561,526
[45] Date of Patent: Oct. 1, 1996

[54] THREE-DIMENSIONAL MEASUREMENT DEVICE AND SYSTEM

[75] Inventors: Edward D. Huber, Sunnyvale; Rick A. Williams, Orinda, both of Calif.

[73] Assignee: Lockheed Missiles & Space Company, Inc., Sunnyvale, Calif.

[21] Appl. No.: 336,389

[22] Filed: Nov. 8, 1994

Related U.S. Application Data

[63] Continuation-in-part of Ser. No. 249,841, May 26, 1994.

[51] Int. Cl.⁶ .................................................. G01B 11/24
[52] U.S. Cl. .................................. 356/376; 382/154
[58] Field of Search .................................. 356/371, 376; 282/152, 154

[56] References Cited

U.S. PATENT DOCUMENTS

| | | | |
|---|---|---|---|
| 4,575,805 | 3/1986 | Moermann et al. | 356/376 |
| 4,825,263 | 4/1989 | Desjardins et al. | 356/376 |
| 5,175,601 | 12/1992 | Fitts | 356/376 |
| 5,307,151 | 4/1994 | Hof et al. | 356/376 |

OTHER PUBLICATIONS

David R. Burton et al., "Multichannel Fourier Fringe Analysis As An Aid to Automatic Phase Unwrapping", *Applied Optics*, May 10, 1994, vol. 33, No. 14, pp. 2939–2948.
Katherine Creath, "WYKO Systems for Optical Metrology", *SPIE vol. 816 Interferometric Metrology*, 1987, pp. 111–126.
Chris L. Koliopoulos et al., "Real–Time Video Rate Phase Processor", *SPIE vol. 2003 Interferometry VI*, 1993, pp. 264–268.
Daniel Malacara, "Optical Shop Testing", John Wiley & Sons, Inc., 1992, pp. 668–681.
Carolyn R. Mercer et al., "Fiber–Optic Projected–Fringe Digital Interferometry", *NASA Technical Memorandum 103252—1990 Fall Conference on Hologram Interferometry and Speckle Metrology sponsored by the Society for Experimental Mechanics*, Baltimore, Maryland, Nov. 4–7, 1990, pp. 1–8.
B. F. Oreb et al., "Moire based Optical Surface Profiler for the Minting Industry", Preprint of article that appeared in *SPIE Proceedings*, vol. 1776, 1992, pp. 48–57.
James C. Wyant, "Interferometric Optical Metrology: Basic Principles and New Systems", *Laser Focus*, May 1982, pp. 65–71.
Yiping Xu et al., "Simple and Effective Phase Unwrapping Technique", *SPIE vol. 2003 Interferometry VI*, 1993, pp. 254–263.

Primary Examiner—F. L. Evans
Attorney, Agent, or Firm—Edward J. Radlo; J. P. Violette

[57] ABSTRACT

A measurement device or system (11) for determining features of a three-dimensional object (20) from two-dimensional images includes a projector (27) for projecting a pattern (73) upon the object (20), at least one imager (17, 19) for obtaining multiple sets of image data of the illuminated object (20) and a processor (47) for obtaining a three-dimensional image (81) of the object (20) from the multiple sets of data.

4 Claims, 18 Drawing Sheets

FIG_1B
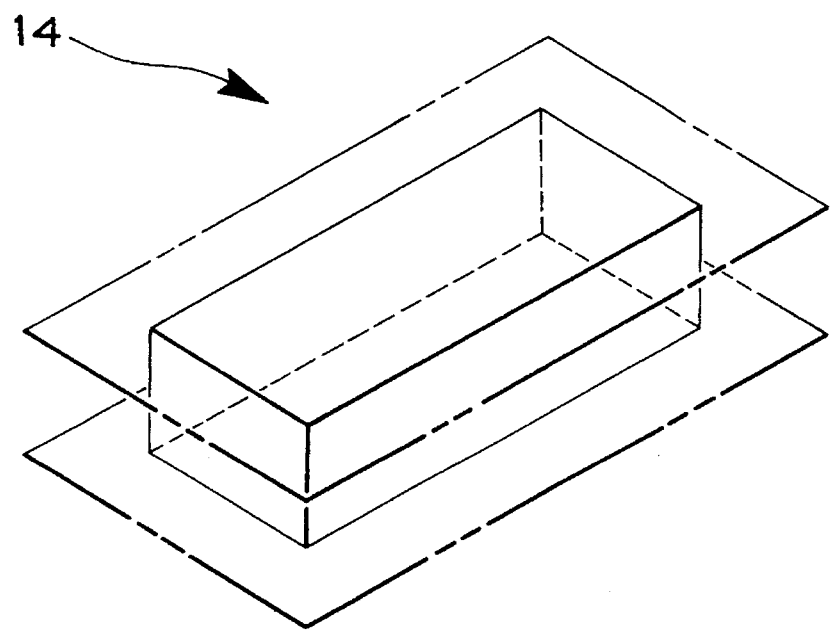
FIG_1C
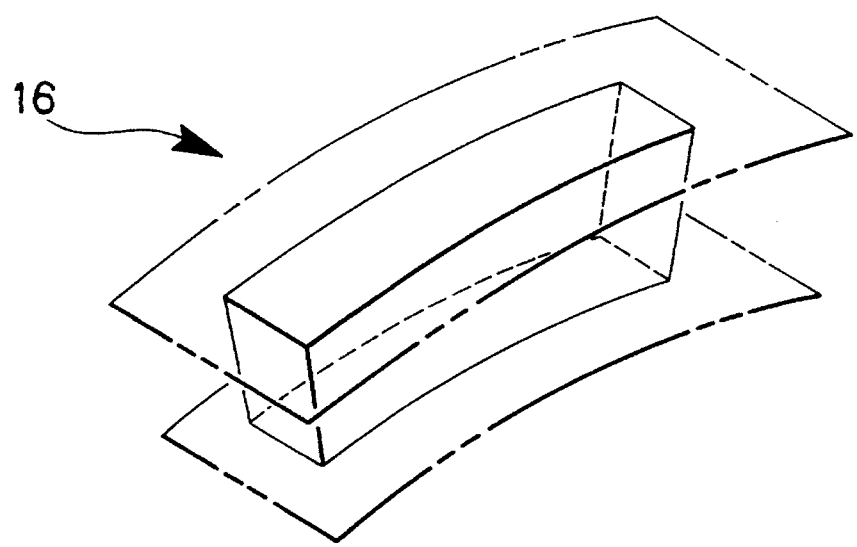

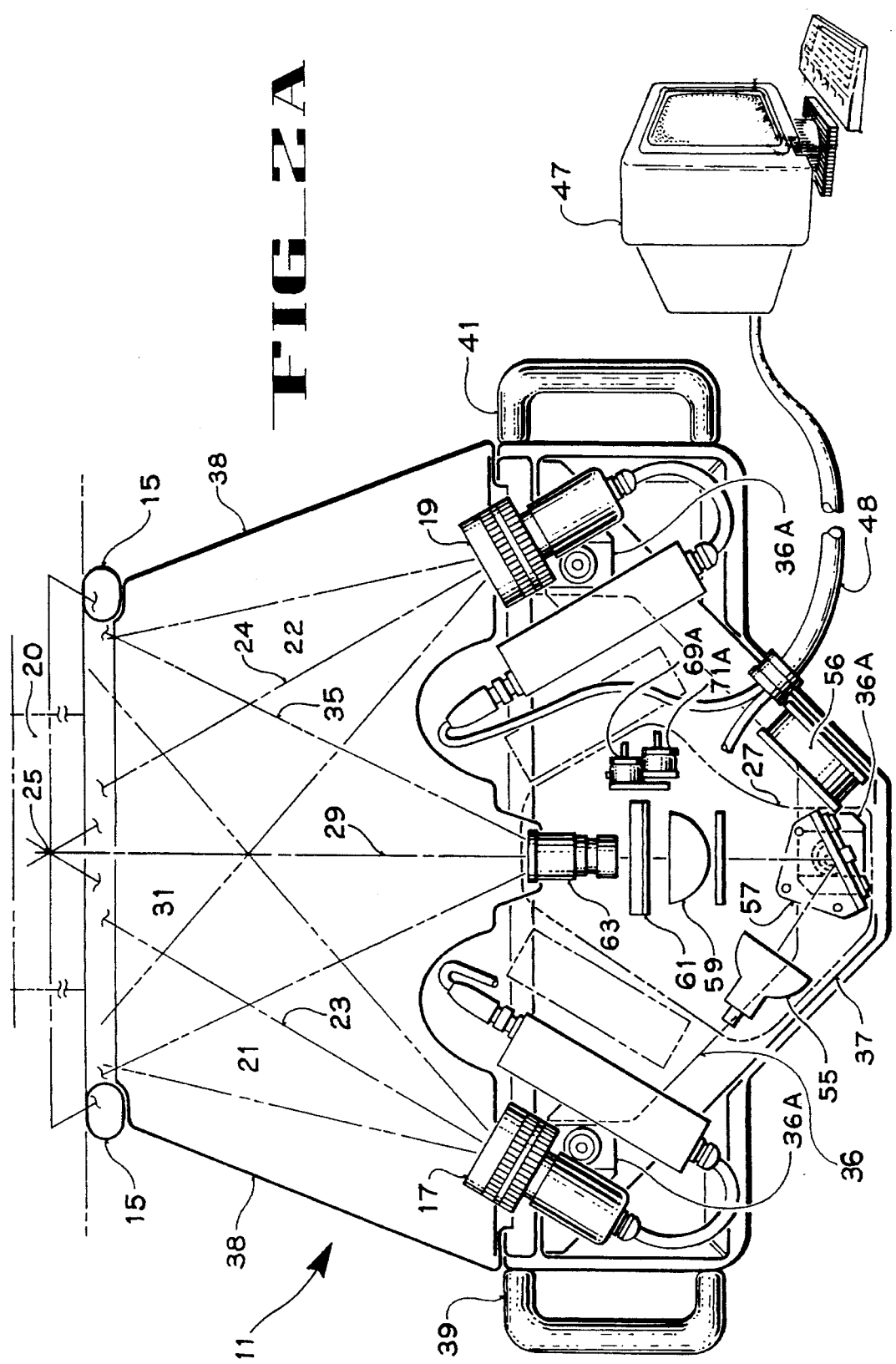

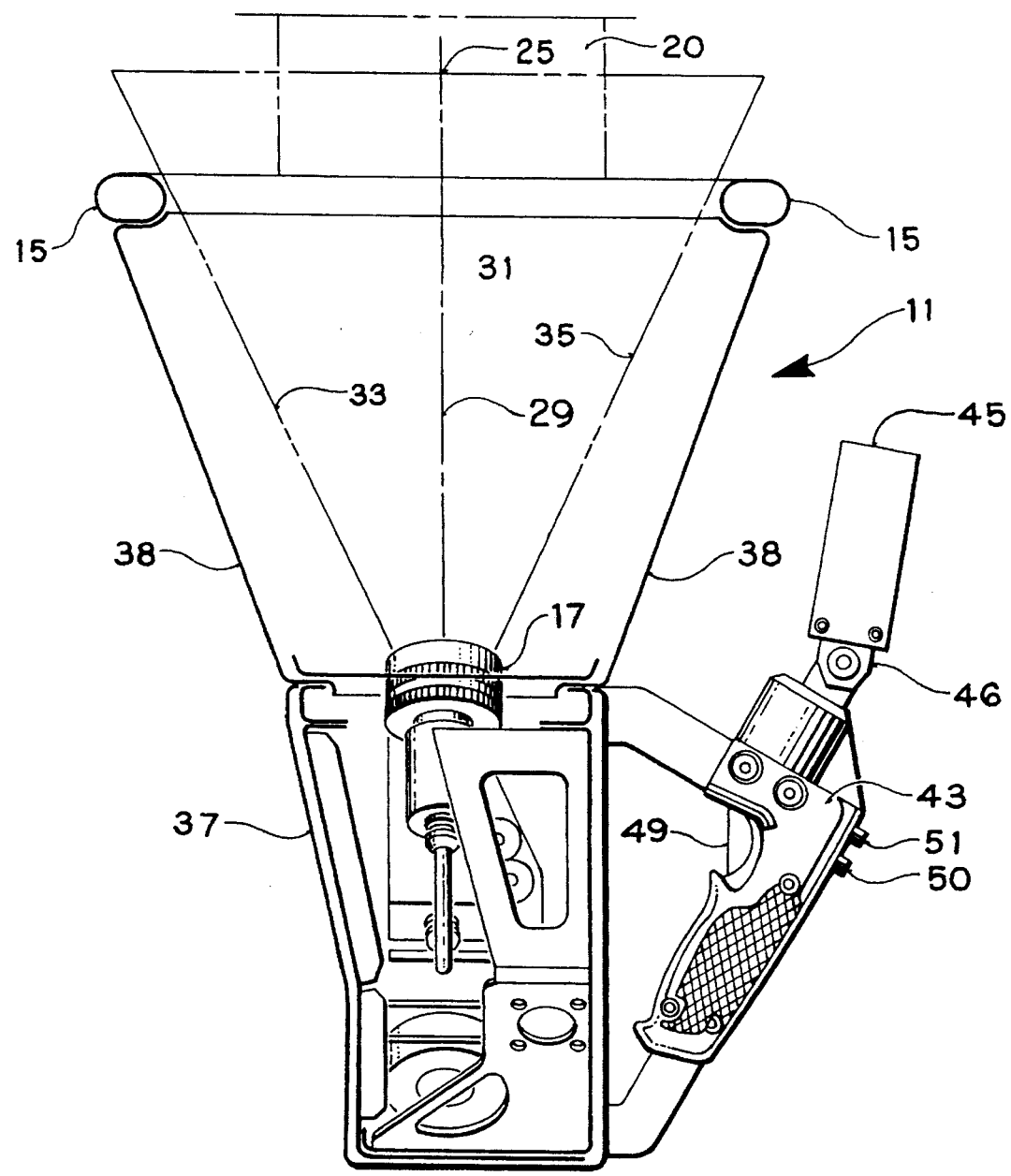

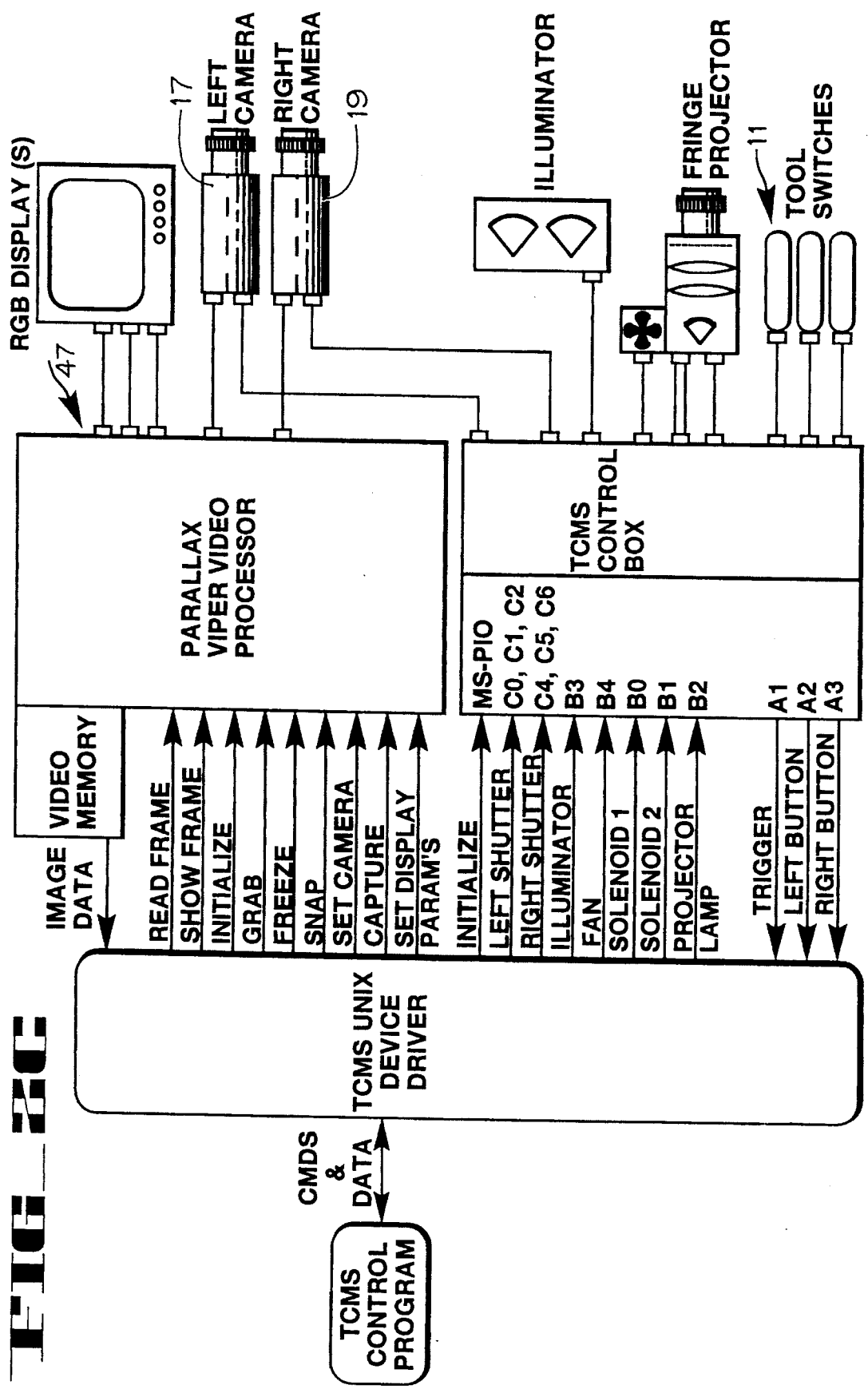

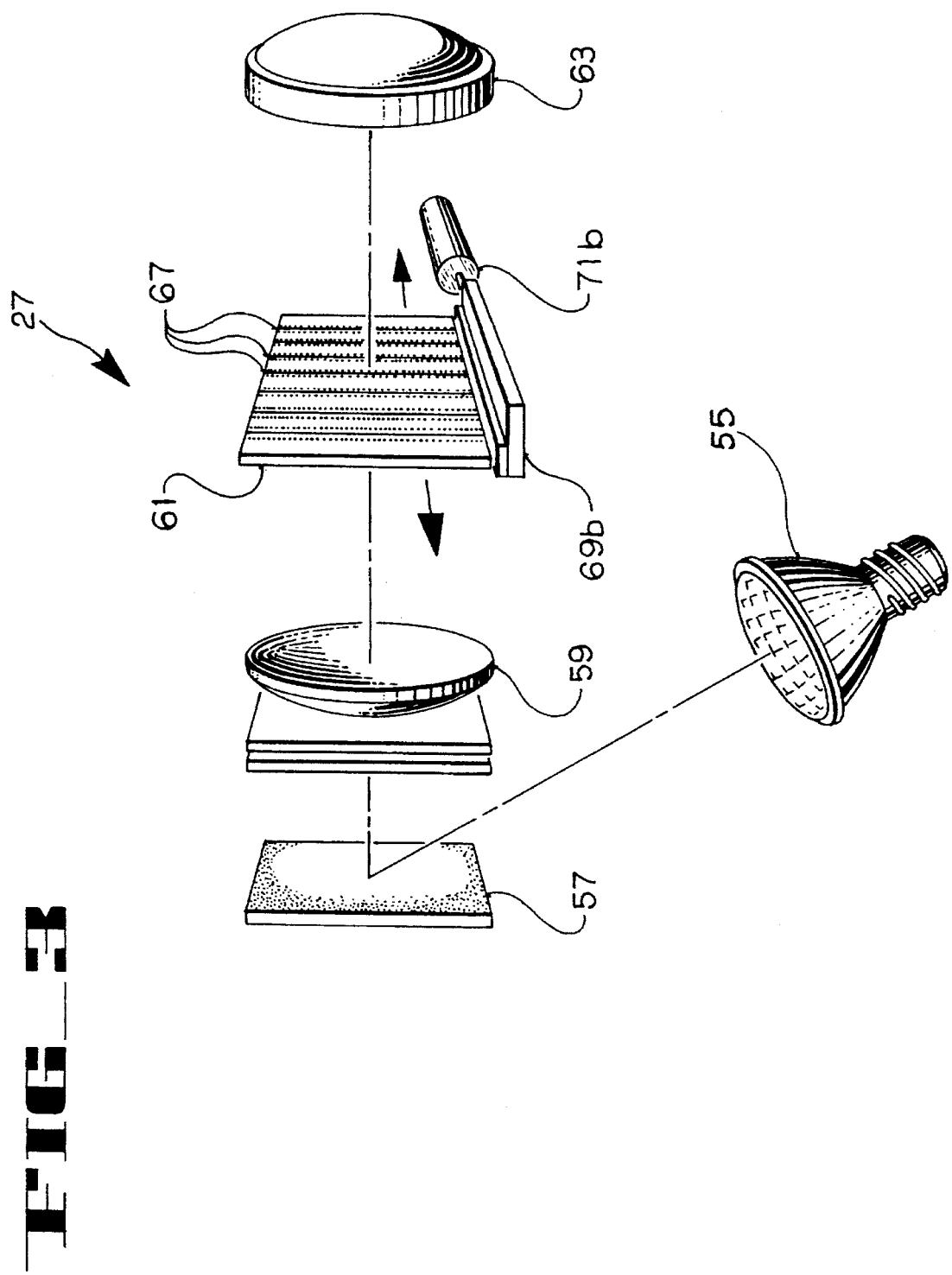
FIG_3

FIG_4A
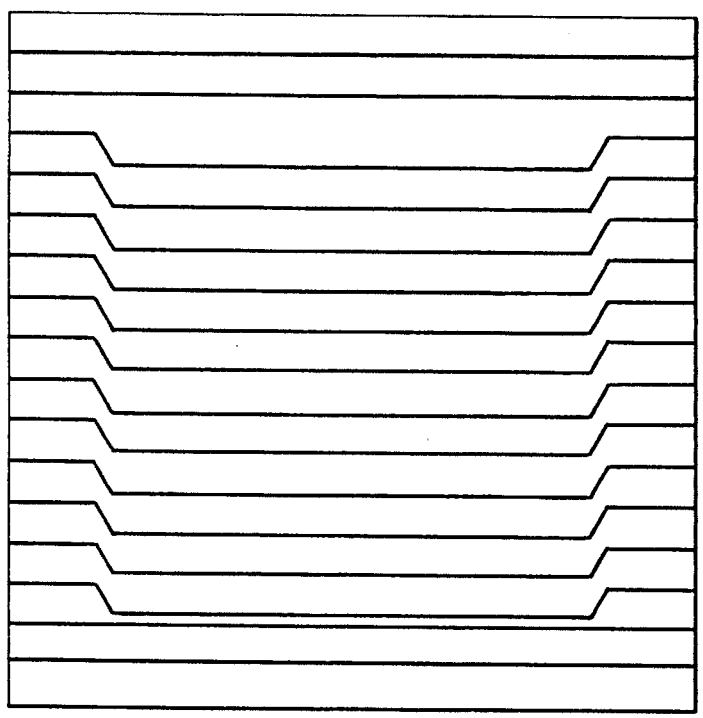
0 DEG
FIG_4B
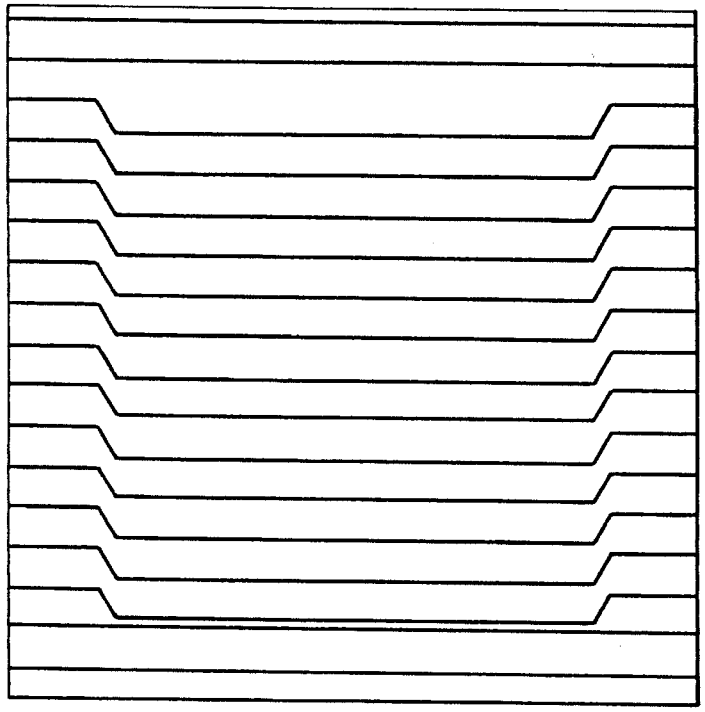
90 DEG

FIG_4C
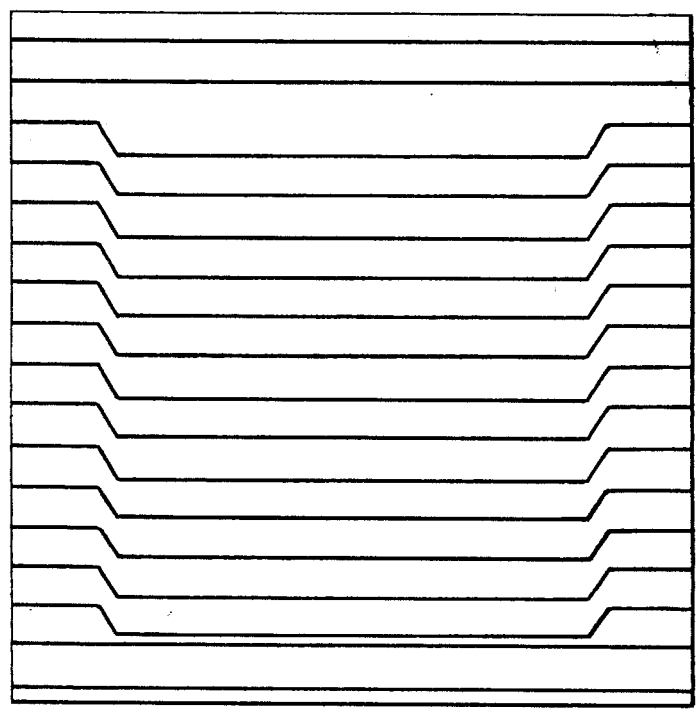
180 DEG
FIG_4D
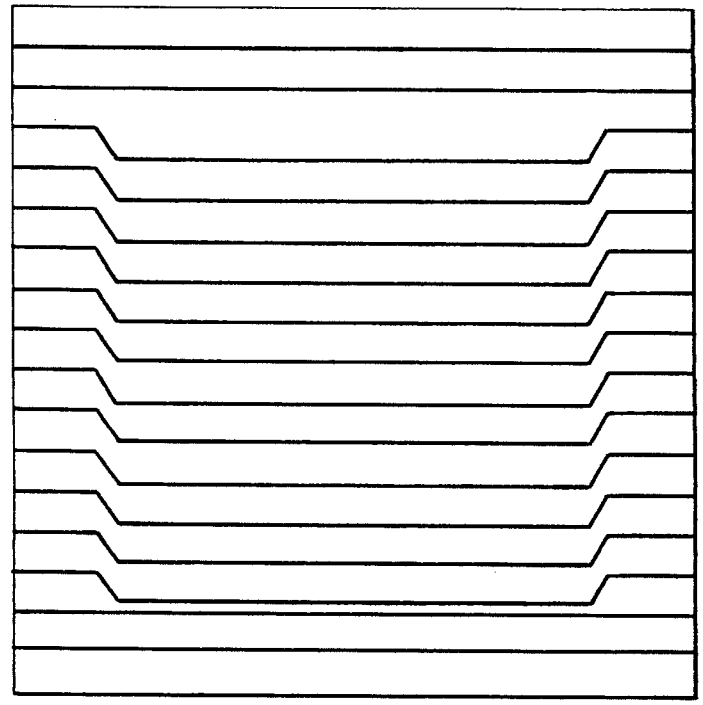
270 DEG

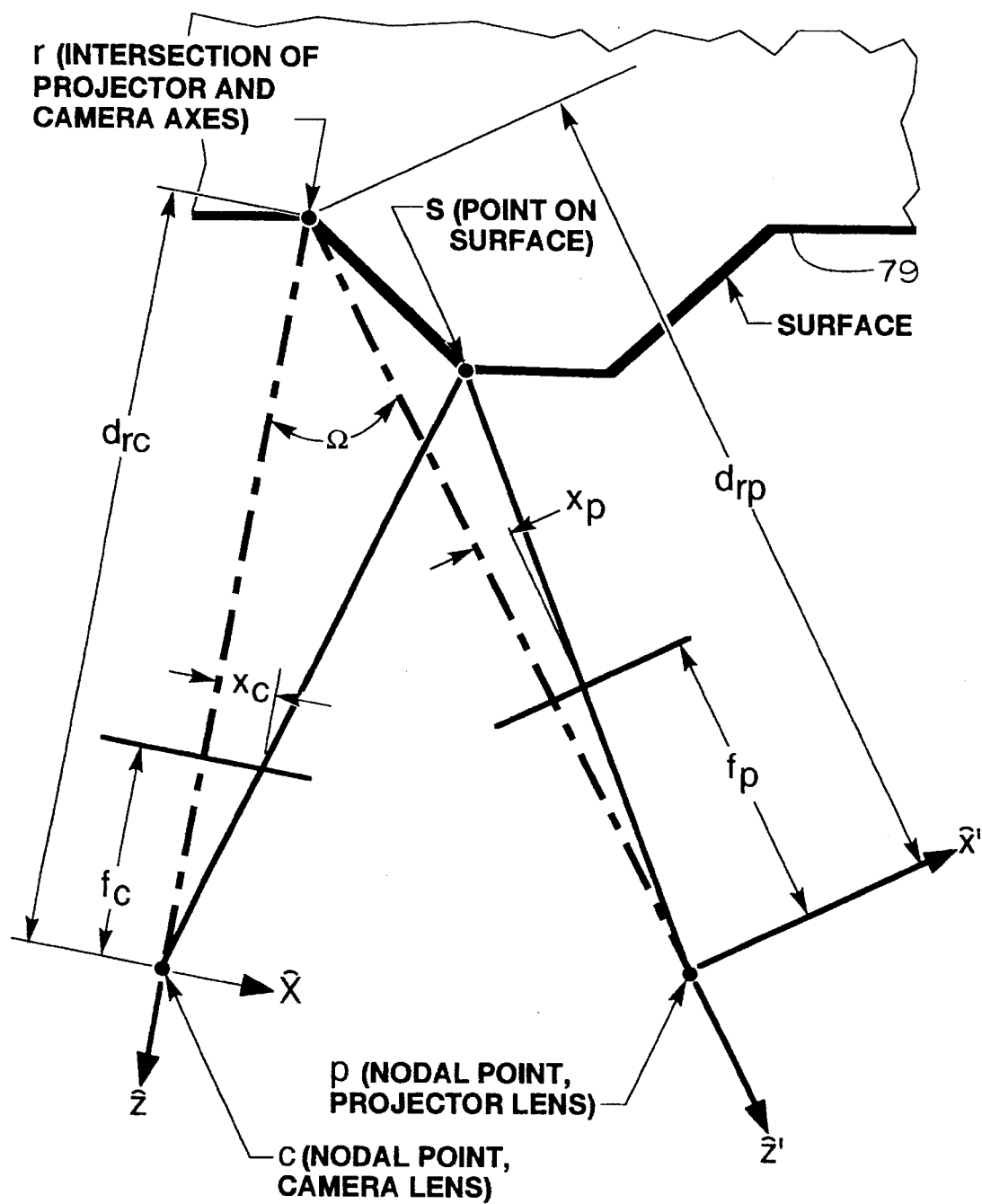
FIG_5A

FIG_5B
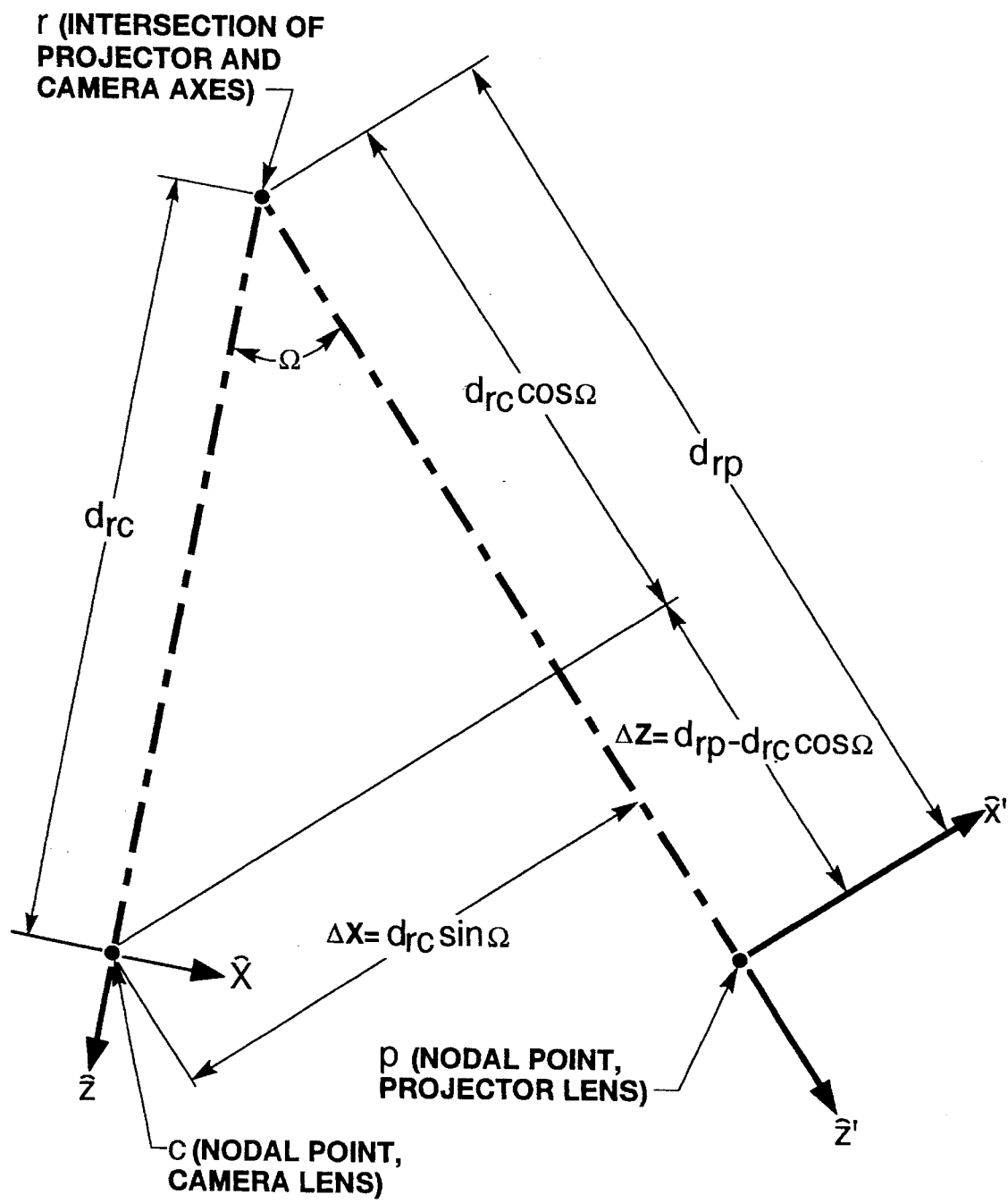

FIG_6A
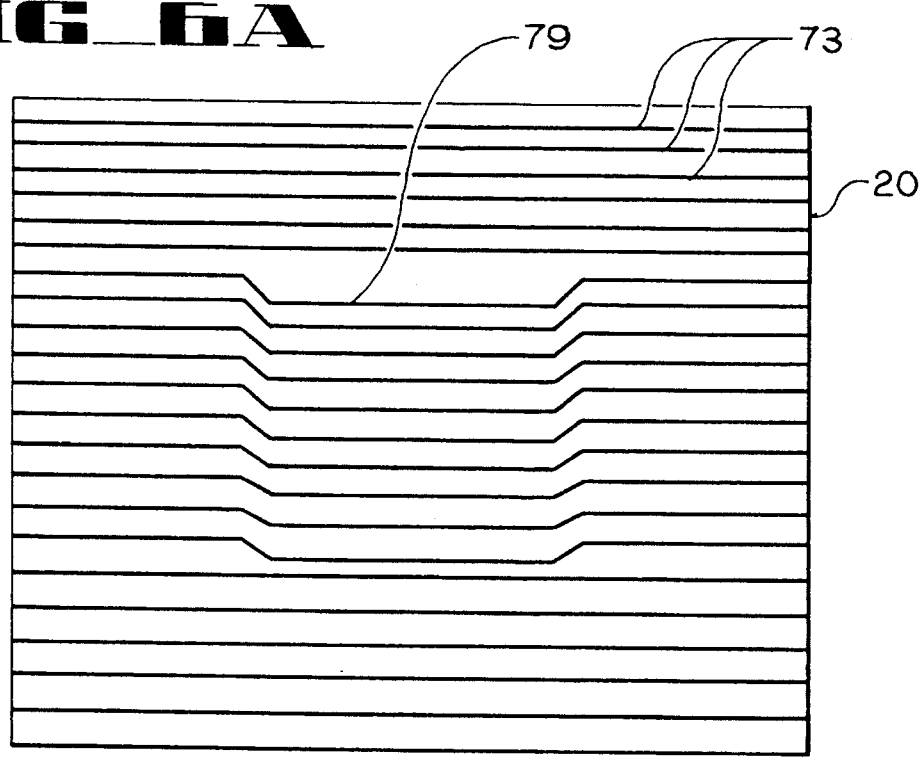
FIG_6B
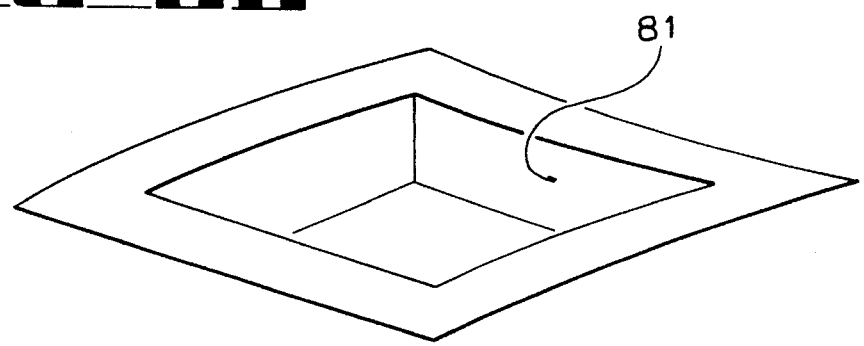
FIG_6C
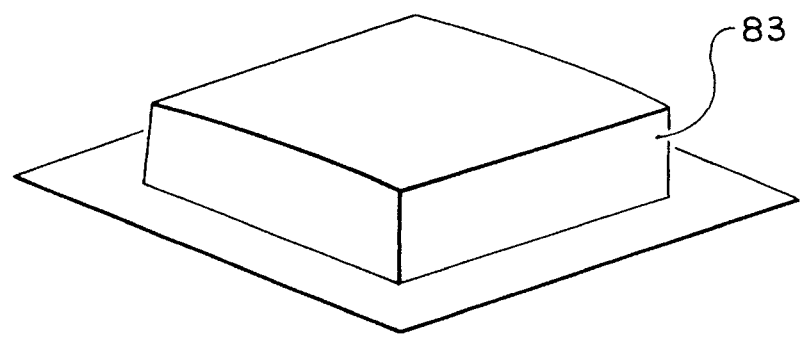

FIG_7A
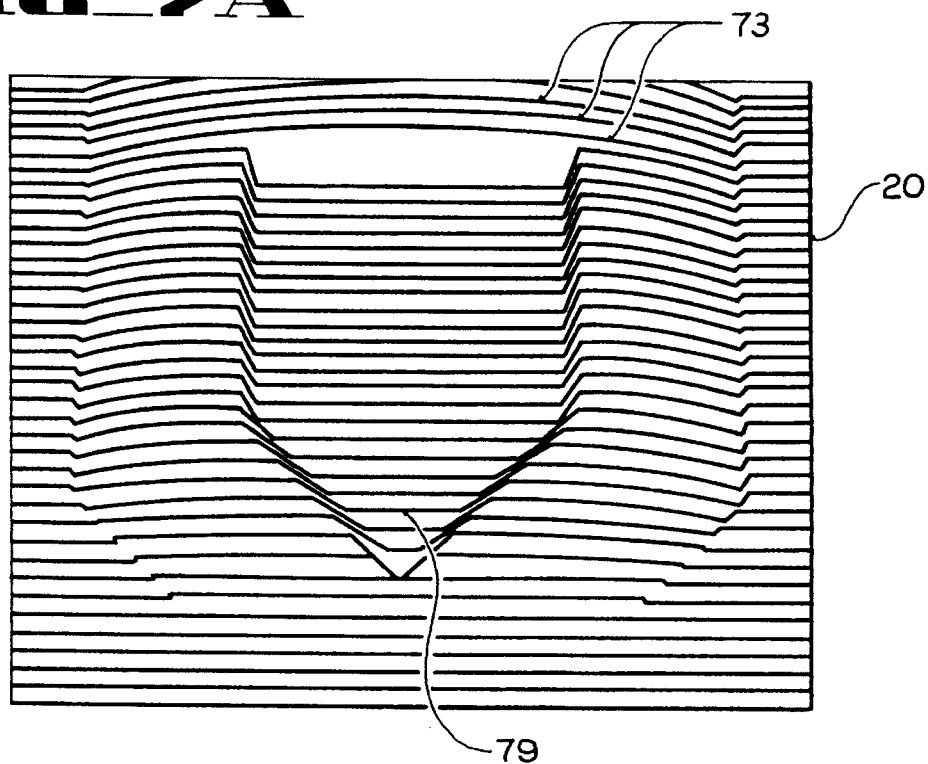
FIG_7B
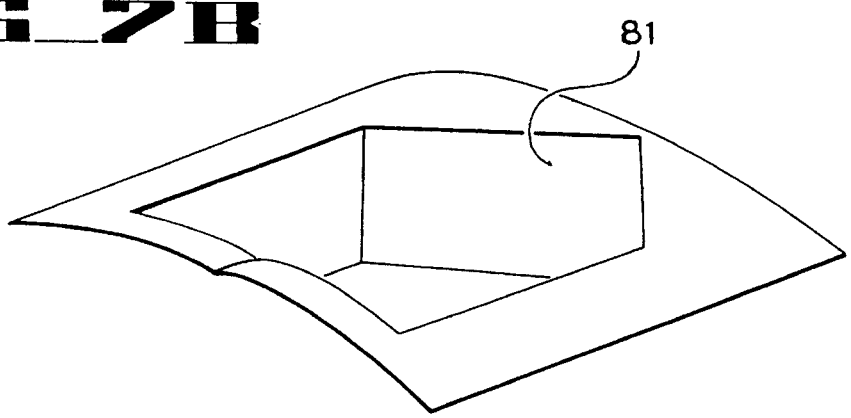
FIG_7C
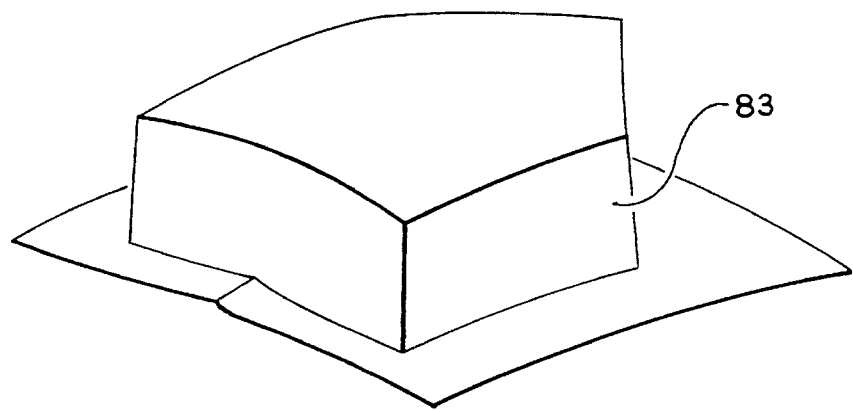

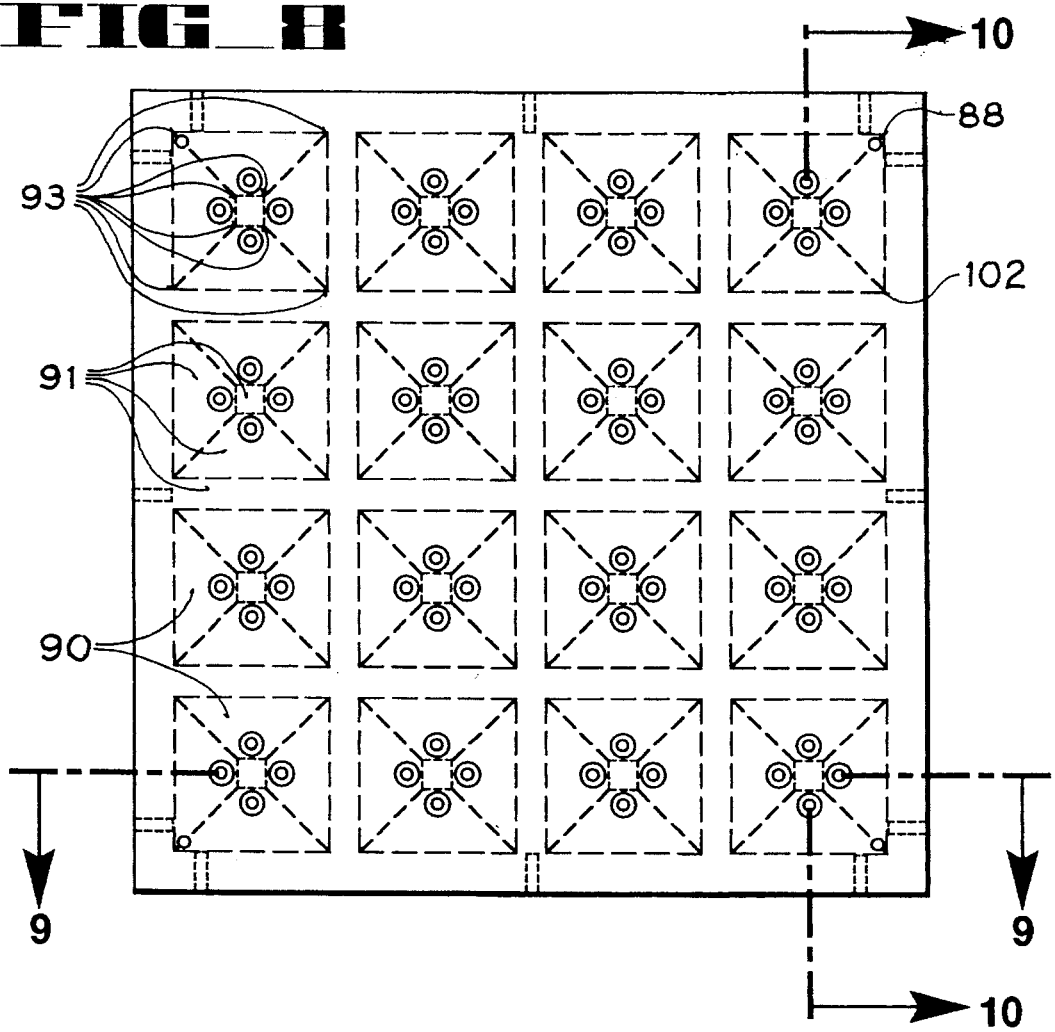
FIG_8
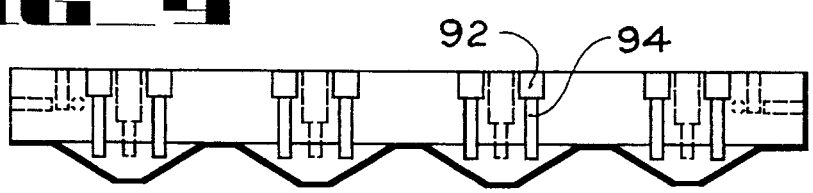
FIG_9
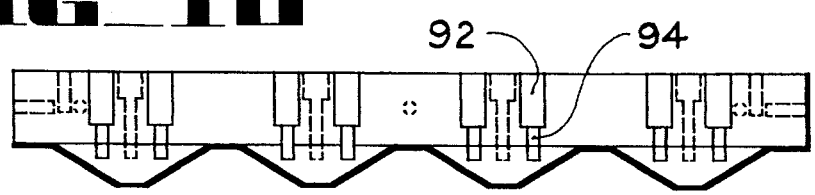
FIG_10

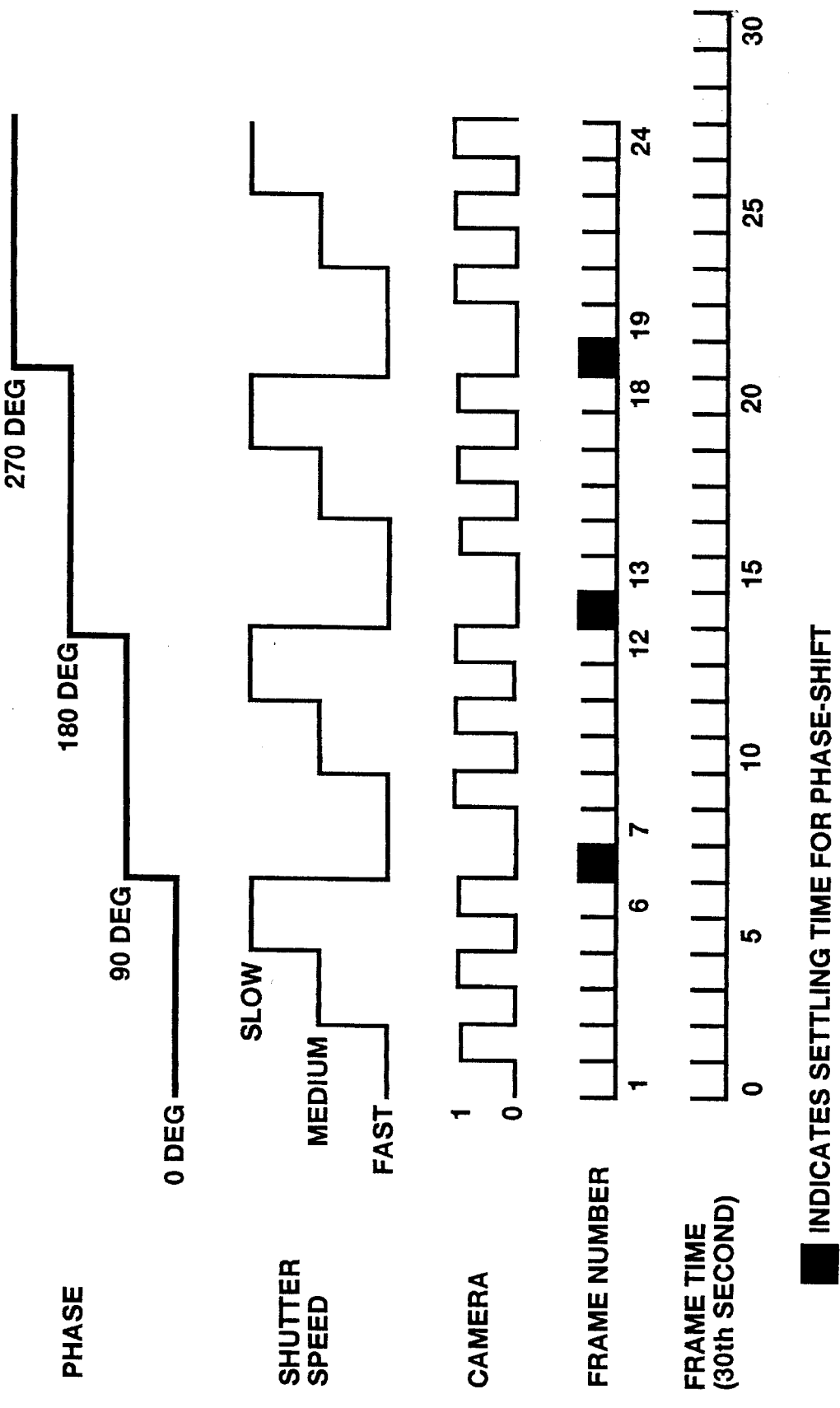

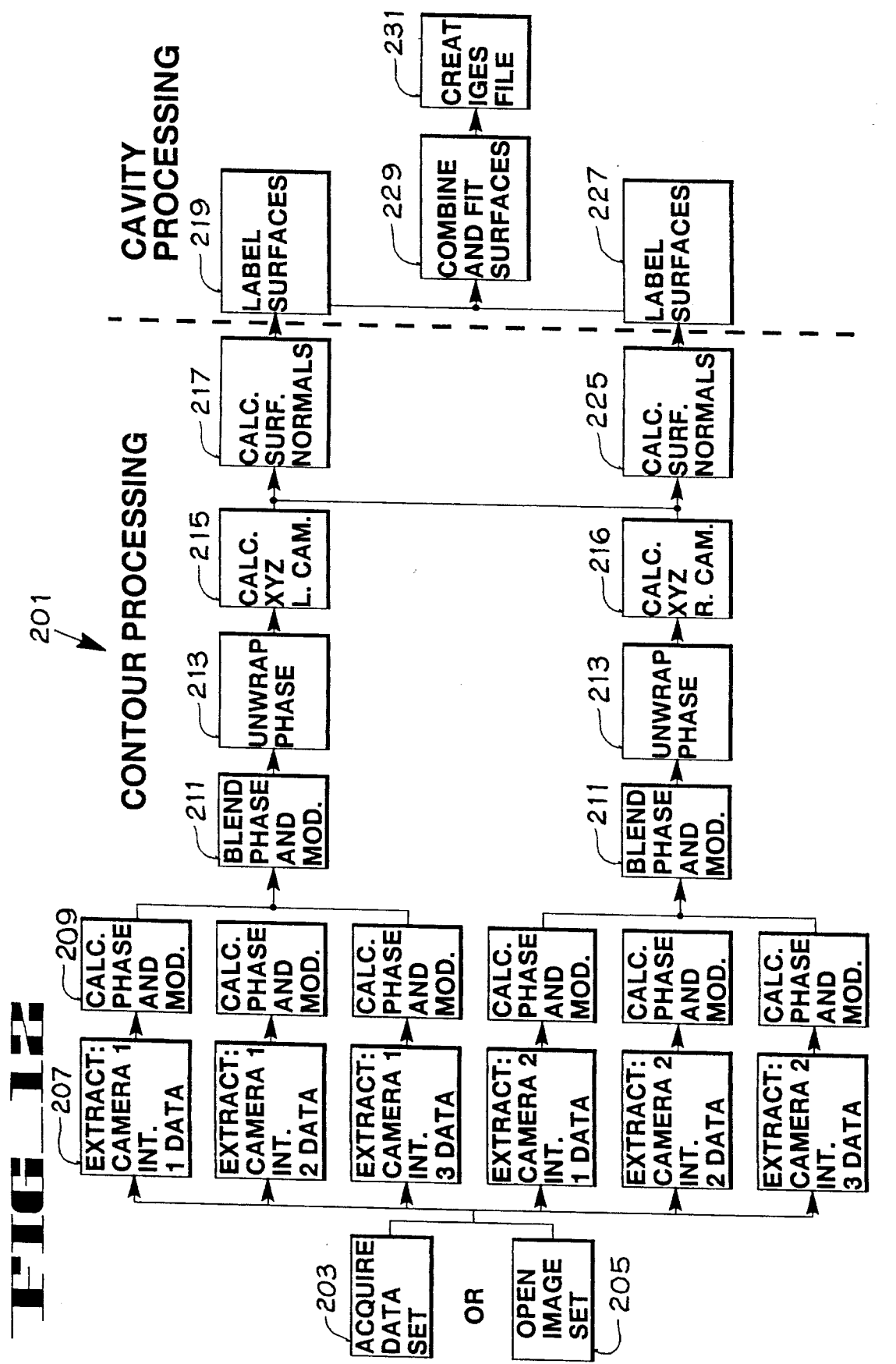

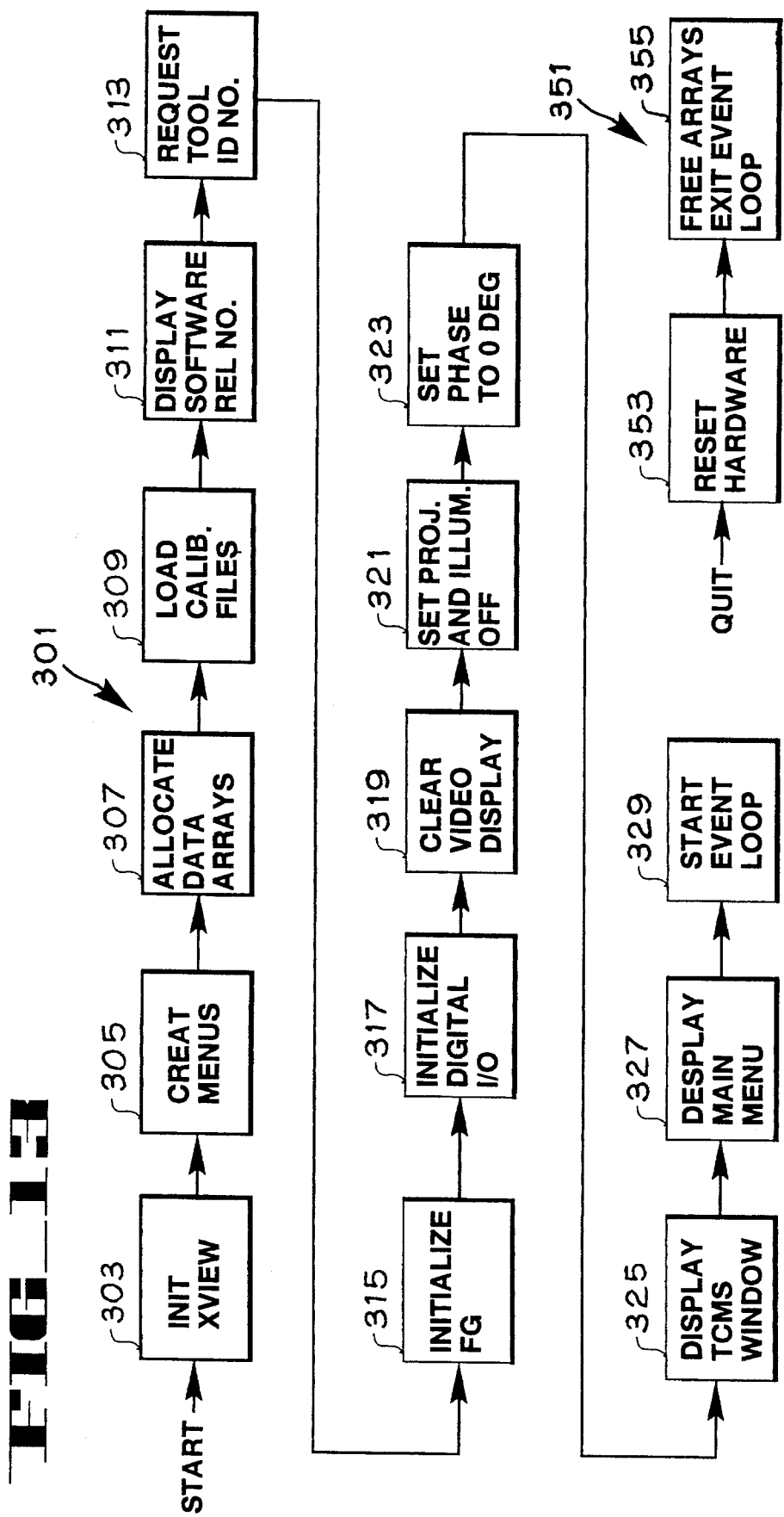
FIG_13

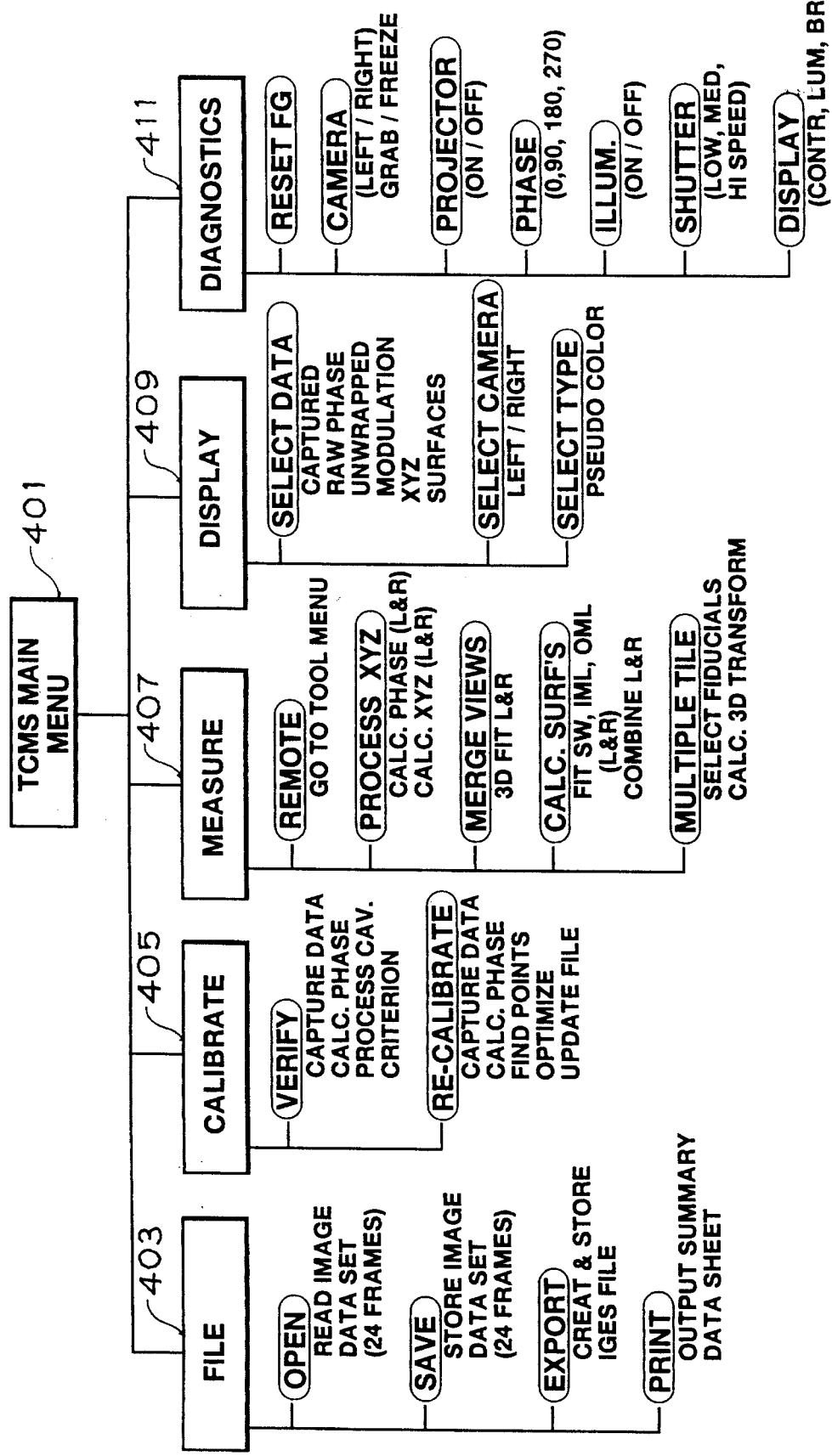
FIG_14

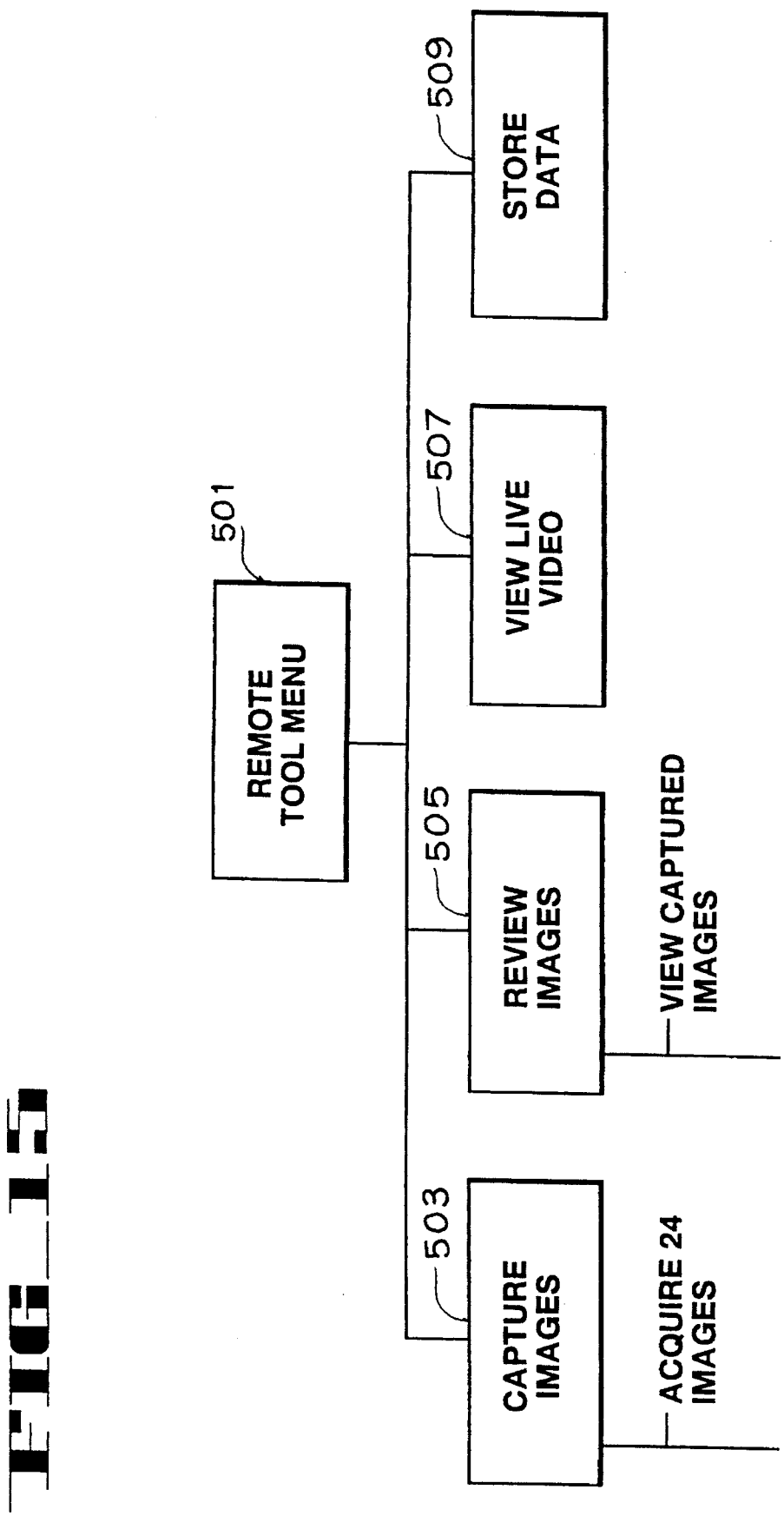
FIG_15

5,561,526

1

THREE-DIMENSIONAL MEASUREMENT DEVICE AND SYSTEM

The invention described herein is a subject invention under National Aeronautics and Space Administration contract NAS 10-10900; the U.S. Government has rights therein.

This application is a continuation-in-part of U.S. patent application Ser. No. 08/249,841, filed May 26, 1994.

TECHNICAL FIELD

This invention pertains to the fields of three-dimensional optical measurement devices, systems, and methods; and more particularly to space shuttle tile measurement devices, systems and methods.

BACKGROUND OF THE INVENTION

In classical interferometry measurement techniques, measurement dynamic range and accuracy are very limited. High accuracy can be achieved over just a small range of depth.

Moiré technique measurements are more suited to measuring objects that are nearly two-dimensional, and require high frequency fringes for both projection and reference, making alignment and phase shifting problematic.

Photogrammetry measurements are very slow and labor intensive, and provide high accuracy measurement for only a sparse set of points on a surface.

Plaster mold techniques are slow, very labor intensive and messy.

A laser scanning technique has had limited success and has been burdened by large and heavy measurement systems.

Therefore, there is a need for a device, system or method that provides high accuracy depth measurements over a large range of depth, that has a reliable calibration procedure for enhancing measurement accuracy, that obtains measurement data for a surface at very high resolution to provide a full three-dimensional surface image, and that quickly performs measurement and data processing tasks.

There is a further need for a projection apparatus that is lightweight, handheld, mobile and versatile for ease in operation.

There is a further need for a projection device, system, or method that does not suffer from coherent light effect problems, that reduces alignment and optical quality requirements, that minimizes phase shifting motion accuracy requirements, that obtains high resolution three-dimensional measurements, and that has high-speed measurement capability.

SUMMARY OF THE INVENTION

In accordance with the illustrated embodiment of the present invention, an optical device or system (11) for optically measuring contours of a three-dimensional object (20) includes at least one imager (17, 19) for obtaining multiple sets of image data of the illuminated volume and an interpreter (47) for obtaining a single digital three dimensional reconstructed image (81) of the object (20). The device or system (11) is designed for placing the imager (17, 19) with a field of view of the object (20); obtaining multiple sets of image data sequentially in rapid succession from multiple imagers (sensors) (17, 19) at different spatial positions; and converting the multiple sets of data into a single digital three dimensional reconstructed image (81).

2

BRIEF DESCRIPTION OF THE DRAWINGS

FIG. 1B is an illustration of an exemplary hardcopy printout of a rectangular shuttle tile cavity specification obtained according to the present invention.

FIG. 1C is an illustration of an exemplary hardcopy printout of a curved surface shuttle tile cavity specification obtained according to the present invention.

FIG. 2A is a first side view of a transparent pictoral illustration of an optical device or system according to the present invention.

FIG. 2B is a second side view of a transparent pictoral illustration of an optical device or system according to the present invention.

FIG. 2C is a block diagram showing the operational control interface of the system components.

FIG. 3 is an exploded diagram of a projector 27 suitable for use in the present invention.

FIG. 4A, 4B, 4C and 4D show a set of four frames of the projection of fringe lines 73 onto a viewed object 20.

FIG. 5A is a first side view showing a partial geometry of the optical system 11 of the present invention.

FIG. 5B shows the relation between coordinate systems for the partial geometry depicted in FIG. 4.

FIGS. 6A, 6B, and 6C are a set of illustrations showing how the present invention can model a first object 20.

FIGS. 7A, 7B, and 7C are a set of three illustrations showing how the present invention can model a second object 20.

FIG. 8 shows a test calibration fixture for use in the present invention.

FIG. 9 shows a cross-sectional view of the test calibration fixture of FIG. 8.

FIG. 10 shows a cross-sectional view of the test calibration fixture of FIG. 8.

FIG. 11 shows a timing sequence for data acquisition in the present invention.

FIG. 12 shows a cavity processing flow diagram of the present invention.

FIG. 13 shows an initialization flow diagram of the present invention.

FIG. 14 shows a main menu display on the console of the present invention.

FIG. 15 shows a remote tool menu display on the display of the present invention.

DETAILED DESCRIPTION OF THE PREFERRED EMBODIMENTS

Figure 1A:
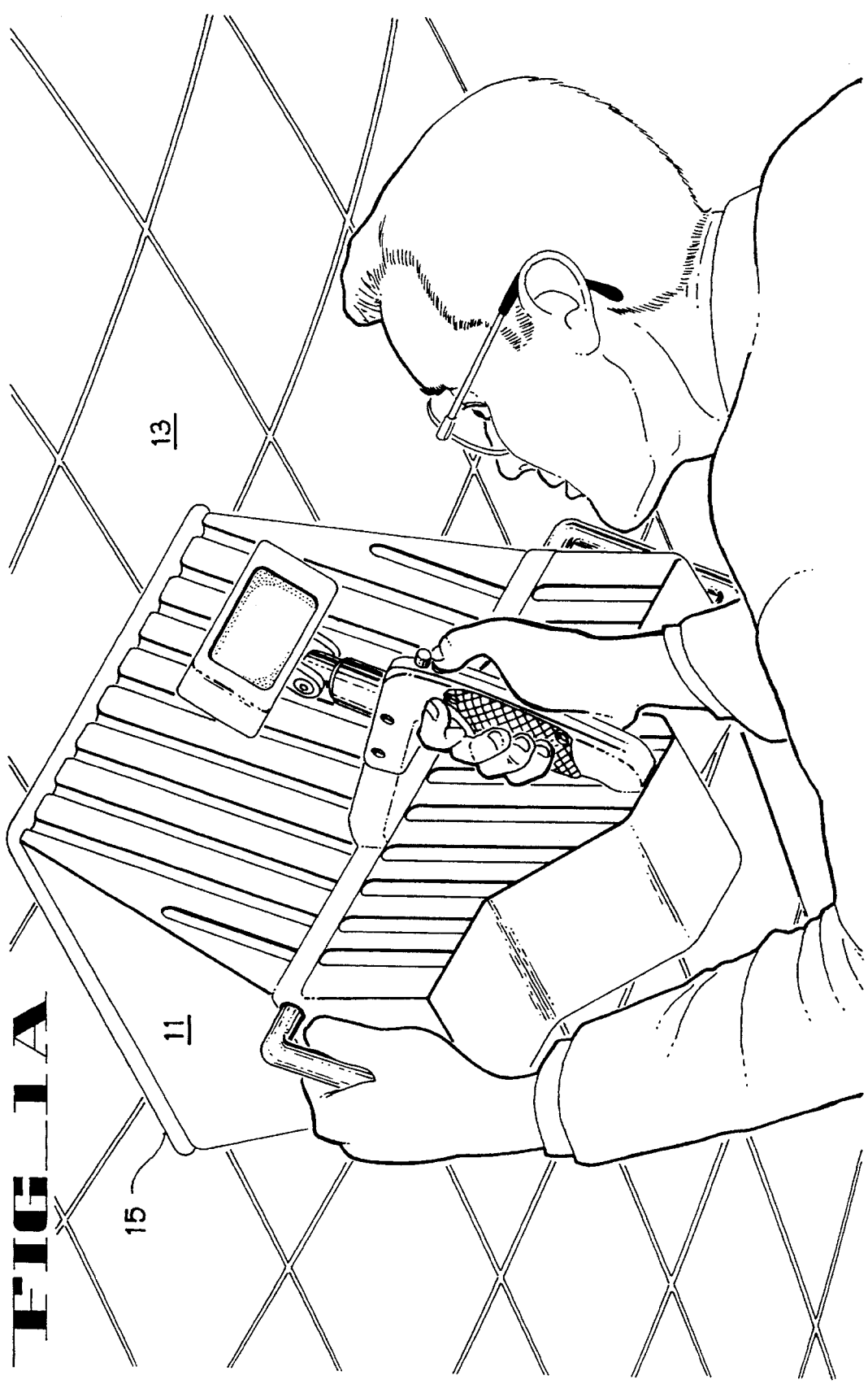
FIG. 1A is a pictoral illustration of an optical device or system according to the present invention being used by an operator.

In FIG. 1A, tile cavity measurement device 11 according to the present invention is illustrated in operation by an operator upon tiled face 13 of a space shuttle. The measured tile cavities range in surface area from 2"×6– to 8"×6" and in depth from 0.25" to 4.5", and have both curved and planar top and bottom surfaces and planar side walls that may have multiple facets and angled surfaces. By placing rubberized, outer rim 15 of measurement device 11 about a cavity vacated by a removed tile, measurement device 11 may be activated by the operator to obtain a three-dimensional digital image of the shuttle tile cavity which is accurate in size and shape. The measurement device 11 weighs less than sixteen pounds and is operable in a similar manner as a photographic camera. The digital image may be stored in a database or transferred to a computer aided design system for direct engineering evaluation or for automated fabrication of a replacement tile. A hardcopy printout may be obtained by processing the image data, an example of which is shown in FIG. 1B, 1C where square tile and curved tile cavities 14, 16 have been drawn in three-dimensions. The three-dimensional drawings or specifications of replacement tiles for cavities 14, 16 may readily be obtained from the same image data.

In FIGS. 2A and 2B, optical device 11 according to the present invention is transparently illustrated to show two high resolution electronic cameras 17, 19 disposed to develop respective fields of vision of tile cavity (object) 20 within respective conic regions 21, 22. Conic regions 21, 22 have respective centerlines 23, 24 approximately 30 degrees offset from a perpendicular extending from the face of object 20 and are oriented to cross at depth 25 of object 20. Conic regions 21, 22 describe fields of vision extending from respective lenses of cameras 17, 19 to areas surrounding the surface area of object 20. Depth 25 corresponds to about ⅔ of the depth of object 20. The benefit of having more than one camera is that a second camera can sense surface variations or contours that are otherwise hidden by a first camera, particularly where object 20 includes abrupt surfaces. Fringe line projector sub-system (projector) 27 is disposed between cameras 17, 19 to illuminate object 20 with rays centered about center beam 29 and extending within a conic region 31 bordered by lines 33, 35, and surrounding the surface area of object 20. Additional light projectors may be used to further illuminate contours of object 20. By orienting cameras 17, 19 and projector 27, the line of center beam 29 may join centerlines 23, 24 at their intersection at depth 25. In an alternative design, multiple projectors 27 may be used to more clearly illuminate surface variations or contours.

Cameras 17, 19 and projector 27 are mounted upon rigid box weldment optical mounting bench 36 with shock mount isolators 36a at three separate locations within housing 37. Optical bench 36 provides a stable base for position sensitive cameras 17, 19 and projector 27. The optical bench 36 is mounted to housing 37. Shock mount isolators 36a use absorbing material, such as rubber grommets, placed between plate 36 and housing 37 to buffer shocks, stresses or strains from cameras 17, 19 and projector 27 which might affect alignment and positioning. Shroud 38 extends from housing 37 to mount 15 to block out background light and stabilize location of cameras 17, 19 and projector 27 with respect to object 20. Housing 37 and shroud 38 are made of plastic; however, many other rigid lightweight materials would be suitable. Housing 37 includes handles 39, 41, 43 (plus another handle not shown) for ease in portability and usage. Handle 43 extends from the midsection of housing 37 for balanced positioning of measurement device 11 by a user about object 20. Color video monitor (display) 45 is a liquid crystal display (LCD) color monitor, part number FDM-330, manufactured by Sony Corporation and connects to handle 43 through swivel 46. Color video monitor also connects electrically to external computer 47 through data and control transmission line 48. Computer 47 is an Embedded Sparc VME Computer System manufactured by Matrix Corporation and includes a SPARC-2SE processor with a Weitek floating point processor, a Viper digitizer/display card, a 16" Sun color monitor, a 13" RGB Sony monitor, a keyboard with a trackball, a video synchronizer, a control box and a printer. The operational control interface of the computer 47 and measurement device 11 is shown in FIG. 2C. Display 45 receives an image of object 20 from a data link with cameras 17, 19 and computer 47 and displays the image as seen through the fields of vision of cameras 17, 19 along with display menus for user selections. Based on the viewed image, a user may adjust the position of the measurement device 11 about object 20. Trigger 49 is mounted on handle 43 and electrically connects to computer 47 which controls cameras 17, 19 to provide a switching mechanism enabling a user to activate cameras 17, 19 by squeezing trigger 49 with a forefinger. Menu selection buttons 50, 51 are situated on the back of handle 43 and connect electrically to computer 47 which controls display 45 for selection of various operating modes, such as testing or imaging. Display 45 is electrically connected to computer 47 which controls and transfers images from cameras 17, 19 and projector 27. Based upon user menu selection using the push buttons 50, 51 or trigger 49, display 45 may signal computer 47 to activate electrical portions of cameras 17, 19 and projector 27.

As shown in FIGS. 2A, 2B and 3, projector 27 includes incandescent projector lamp 55 which provides a light source for cameras 17, 19 and a 12 Vac fan 56 for cooling the area surrounding the lamp. Reflector 57 is a dichroic reflector which transmits the infrared light from projector lamp 55 away from condenser lens system 59 and reflects a visible light beam through condenser lens system 59, grating slide 61, and projector lens 63, and onto object 20. Condenser lens system 59 includes a dichroic filter (or hot mirror) which transmits visible light and reflects infrared light, a heat absorbing optical glass filter and an aspheric condenser lens. Although described above in a preferred embodiment, projector 27 may be selected of any type capable of illuminating object 20 with a field of straight fringe lines. The fringe lines are produced by grating lines 67 on grating slide 61 with a sinusoidal transmission line pattern having a 2 line/millimeter frequency, 80% modulation, and less than 3% harmonic distortion. Grating slide 61 is mounted upon translation stage 69. During imaging mode, grating slide 61 is translated four times on translation stage 69 by 25% of a grating line width for each image exposure obtained by cameras 17, 19. Solenoids 71a (or alternatively motor is an 8 Vdc solenoid, part number 174534-033, manufactured by Ledex Inc., connects to translation stage 69a (or alternativley 69b) and causes the translation of grating slide 61 when activated by computer 47. The positioning of grating slide 61 corresponds to 0, 90, 180, and 270 degree translations over a sinusoidal range of values. As light passes through grating lines 67 and impinges upon object 20, object 20 is illuminated with alternating dark stripes of sinusoidally varying intensity (fringe lines 73) as seen in FIGS. 4A–D, 6A, 7A. Cameras 17, 19 thereby view and record a stripe-illuminated cavity volume. Projector 27 may use a white light or a monochromatic light source. Fringe lines 73 falling on object 20 are made to have a sinusoidally varying intensity as seen by cameras 17, 19. This variation is in the x (horizontal) direction in the preferred embodiment. Fringe lines 73 represent lines of maximum intensity. They are vertically disposed in this embodiment and 360° apart in phase. One fringe line 73 is identified with fiducial spot 75 to establish a reference for phase and position calculations during calibration and measurement operational modes.

Cameras 17, 19 are electronic cameras, part number TM-745E, manufactured by Pulnix. Cameras 17, 19 have a field of view encompassing all or part of object 20 and may be of any electronic camera type, such as a high resolution, solid state CCD array, CID, or Vidicon video camera. The resolution is 640×480 pixels with pixel size of 11×13 microns and sensor area 8.8×6.6 millimeters. The shutter is electronically controlled by computer 47 at 1/30 to 1/10000 second. The lens has an 8.5 millimeter focal length with a nominal standoff distance of 12" and a nominal focal ratio between f/1.8 to f/16. The boresight of cameras 17, 19 may form an other than 90° angle with respect to object 20 as depicted in FIGS. 2A, 2B which is at 30 degrees offset, or may be perpendicular therewith. The image plane of each camera 17, 19 is divided into a set of pixels, e.g. 640×480 pixels. Each camera 17, 19 may or may not employ frame integration. Cameras 17, 19 each take high, medium and low exposures which are synchronized with a framegrabber electronic controller connected to computer 47. For each exposure, solenoid 71a (or alternatively motor 71b) causes movement of grating slide 61 to obtain phase shifting. The video images from the two cameras 17, 19 are each captured for the three exposure levels and four phase positions for a total of twenty-four images. By implementing the testing mode, prior to imaging object 20, the accuracy of image data measurements is verified using an external test standard. The external test standard is a dimensionally known rectangular cavity formed from a sheet of aluminum and having dimensions by depth, width and length of 6"×6"×2" which is used in much the same way as standard gauge blocks are used to validate the accuracy of a precision micrometer at the point of usage. An alternate embodiment may utilize a single camera 17, preferably centered over object 20, and a single or preferably, multiple projectors 27 spaced about camera 17. The image data recorded by cameras 17, 19 is output from measurement device 11 in standard IGES (Initial Graphics Exchange Specification) graphics file format from the computer 47 for use by computer aided design programs embedded therein. Computer 47 has a UNIX- or other-based computer operator system and includes a display for showing object 20, storage for storing image data, and user interface. The user interface may include a keyboard, trackball, and/or mouse.

For depth processing, the video image data of the fringe illuminated cavity (object 20) is processed using phase-shifted-fringe-measurement analytical techniques. The processed fringe data provides a three-dimensional reconstruction of the cavity surface area. A second stage of processing identifies the individual cavity surfaces to precisely measure each surface shape. Finally, the measured cavity surface data is converted to an IGES file format. The tile cavity description may be stored in the computer and can be transferred to other computer systems via electronic or magnetic media.

Operation of measurement device 11 is electronically controlled by computer 47 which is connected by umbilical cable 48 via an electronic interface panel. The video images are acquired on a video graphics board in computer 47 and other system electronic hardware is controlled via a digital input/output board.

FIGS. 4A, 4B, 4C and 4D illustrate four successive frames of fringe lines 73 being projected onto object 20. The fact that fringe lines 73 are not completely straight but rather exhibit bumps in the vertical (y) dimension indicates the presence of a contour on object 20, i.e. a change in its depth (z) dimension. One of the fringe lines is marked with a fiducial spot 75 and is highlighted here, simply to show how fringe lines 73 move past a center reference line 77 in successive frames.

In FIGS. 4A–D, the successive frames are 90° apart, and there are four frames. Hence, this embodiment is called the four-bucket algorithm, wherein the frames are, relatively speaking, at 0° phase, 90° phase, 180° phase, and 270° phase. Alternatively, a three-bucket algorithm could be used. The four-bucket algorithm is less prone to errors than the three-bucket algorithm, but takes more processing time. Another alternative method is the Carré method. In the Carré method, the phase shifts between frames can be other than 90°. These are just three examples of algorithms borrowed from phase-shifting interferometry. Any phase-shifting algorithm may be used in the present invention.

Generally speaking, the irradiance distribution of an interference pattern can be written as:

$$I(x,y) = I_{bias}(x,y) + I_{mod}(x,y) \cos(p(x,y) + d)$$

where $I(x,y)$ is the intensity at point x,y; $I_{bias}$ is the background intensity; $I_{mod}$ is the modulation intensity; p is the phase; and d is an arbitrary phase factor based upon where x=0 is (arbitrarily) defined to be on the sinusoid.

There are three unknown quantities: $I_{bias}(x,y)$, $I_{mod}(x,y)$, and $p(x,y)$.

In the four-bucket algorithm, the irradiance distribution can be written as four simultaneous equations as follows, where A, B, C and D represent the four frames:

$$I_A(x,y) = I_{bias}(x,y) + I_{mod}(x,y) \cos(p(x,y) + 0)$$

$$I_B(x,y) = I_{bias}(x,y) + I_{mod}(x,y) \cos(p(x,y) + pi/4)$$

$$I_C(x,y) = I_{bias}(x,y) + I_{mod}(x,y) \cos(p(x,y) + 2pi/4)$$

$$I_D(x,y) = I_{bias}(x,y) + I_{mod}(x,y) \cos(p(x,y) + 3pi/4)$$

These values of intensity are fed into computer 10, which uses the solution for these three simultaneous equations to determine the phase, $p(x,y)$, as follows:

$$p(x,y) = \tan^{-1} \frac{I_D(x,y) - I_B(x,y)}{I_A(x,y) - I_C(x,y)}$$

This is done for each pixel, and becomes the raw phase map. In addition, in the preferred embodiment, the signal-to-noise ratio W is also obtained for each pixel. In the following mathematical derivation, $p(x,y)$ is defined as $x_i$; and $x_0$ and $y_0$ are the pixel location within the image plane of camera 17 (or 19). Other phase-shifting algorithms result in different equations for $p(x,y)$.

Mathematical Derivation

This derivation gives the mathematics required to calculate the xyz location of points on surface 79 of object 20 from a grating line 73 and its image within camera 17 (or 19). Other coordinate systems/equations are possible. From the projector 27, phase x of the points are known. This corresponds to a line projected through a point (the nodal point of the projector lens). This constrains xyz to line on a plane. From camera 17 (or 19), the xy pixel location is known. This constrains xyz to lie along a line. The intersection of the plane and the line determines xyz of a unique point.

FIG. 5A shows a top view of the geometry. All distances and angles shown are positive as drawn. Note that the focal plane of camera 17 (or 19) and the grating slide 61 of projector 27 are not shown in FIG. 5A; rather, the positive image of each are shown. Note also that only the ratios of the xy position to the focal length are relevant. Two right-handed coordinate systems are shown. The unprimed system is aligned with the camera's focal plane and the principal axis of the lens of camera 17 (or 19). Its origin is the nodal point c for the lens of camera 17 (or 19). The primed system is aligned with the grating stripes 73 and has its origin at the nodal point p for the lens of projector 27. For both coordinate systems, the z axis lies along the axis of the lens and points away from the test surface 79. The y axis direction is then determined by rotating the coordinate system around the lens axis until the grating stripes 73 do not vary in the x direction.

In this derivation, the subscript "c" refers to camera 17, and the subscript "p" refers to projector 27.

In FIGS. 5A, 5B, the "intersection" r of the camera 17 and projector 27 axes is shown. Strictly speaking, in three-dimensional space, these axes might not intersect, because camera 17 and projector 27 may lie in different planes. However, FIGS. 5A and 5B compress three dimensions into two, so that in the plane of each of FIGS. 5A and 5B, theses axes do intersect.

Camera Equations

First, consider the image of the surface 79 as seen by the camera 17. In the coordinate system attached to the focal plane, the image occurs at $(x_O, y_O, 0)$. The correction for the tip and tilt of the camera 17 focal plane can be computed as a rotation about the y axis followed by a rotation about the x axis as follows:

$$\begin{aligned} x_{cc} &= x_0 \cos\theta_y + y_0 \sin\theta_x \sin\theta_y \\ y_{cc} &= \phantom{x_0 \cos\theta_y} + y_0 \cos\theta_x \\ z_{cc} &= x_0 \sin\theta_y - y_0 \sin\theta_x \cos\theta_y \end{aligned} \quad [1]$$

The distortion can be included by:

$$\begin{aligned} x_c &= x_{cc} + \Delta x(x_{cc}, y_{cc}) \\ y_c &= y_{cc} + \Delta y(c_{cc}, y_{cc}) \end{aligned} \quad [2]$$

We ignore the small effect that $z_c$ (due to tip and tilt) would have even though the distortion should be based on the angle relative to the optical axis.

Next we translate from the coordinate system located at the focal plane to one located at the nodal point c of the camera 17 lens. This is done by subtracting $f_c$ from $z_c$. We know that the surface point must lie along the line containing the origin (nodal point) and the pixel. The equation for this line is $$x/x_c = y/y_c = z/z_c \quad [3]$$

where $z_c \approx -f_c$.

Projector Equations

Let us now introduce tip, tilt, and distortion to the grating 67. In a double primed coordinate system attached to the grating 67, the parametric form for the equation of a grating line 73 is:

$$\begin{aligned} x'' &= x_v + \Delta x(x_p, t) \\ y'' &= t + \Delta y(x_p, t) \\ z'' &= 0 \end{aligned} \quad [4]$$

where $X_p$ is measured from the fringe line 73 with the fiducial spot 75, and the parameter t varies over the range $-\infty \Rightarrow \infty$. The terms $\Delta x(x_p, t)$ and $\Delta y(x_p, t)$ let us introduce whatever form we wish for distortion. Next, we apply a rotation about the y axis then a rotation about the x axis. Before collecting and rearranging, we have:

$$\begin{aligned} x'\cos\theta_y &+ y'\sin\theta_x \sin\theta_y &- z'\cos\theta_x \sin\theta_y &= x_p + \Delta x(t) \\ &+ y'\cos\theta_x &+ z'\sin\theta_x &= t + \Delta y(t) \\ x'\sin\theta_y &- y'\sin\theta_x \cos\theta_y &+ z'\cos\theta_x \cos\theta_y &= 0 \end{aligned} \quad [5]$$

After rearranging and translating to the nodal point:

$$\begin{aligned} x' &= \phantom{(t+\Delta y(t))\cos\theta_x} + (x_p + \Delta x(t))\cos\theta_y \\ y' &= (t + \Delta y(t))\cos\theta_x + (x_p + \Delta x(t))\sin\theta_x \sin\theta_y \\ z' &= (t + \Delta y(t))\sin\theta_x - (x_p + \Delta x(t))\cos\theta_x \sin\theta_y - f_p \end{aligned} \quad [6]$$

This is the equation for the (curved) grating line 73. The general equation for a straight line through any two points is:

$$\frac{x - x_0}{x_1 - x_0} = \frac{y - y_0}{y_1 - y_0} = \frac{z - z_0}{z_1 - z_0} \quad [7]$$

where the subscripts refer to two different points that the line passes through. In our case, subscript zero is the origin (nodal point) and subscript one is a point on the grating 67 specified by the parameter t. As the t parameter is varied, the line sweeps out a curved surface. The equation for the surface produced when this line is projected through the nodal point p of the lens of projector 27 is:

$$\frac{x'(t)}{(x_p + \Delta x(t))\cos\theta_y} = \frac{y'(t)}{\left\{\begin{array}{l}(t + \Delta y(t))\cos\theta_x + \\ (x_p + \Delta x(t))\sin\theta_x \sin\theta_y\end{array}\right\}} = \frac{z'(t)}{\left\{\begin{array}{l}(t + \Delta y(t))\sin\theta_x - \\ (x_p + \Delta x(t))\cos\theta_x \sin\theta_y - f_p\end{array}\right\}} \quad [8]$$

Transforming Projector to Camera Coordinates

Next, we need to rotate the primed coordinate system until it is aligned with the unprimed system. We do this by first translating and then rotating the origin. The effect is to change the form for equation 8. The change is effected by expressing the old, primed (x',y',z') coordinates in terms of the revised, unprimed (x, y, z ) coordinates. First, FIG. 5B shows the major transformations that we need, the translations in x and z plus the rotation about the y axis. The translation is:

$$\begin{aligned} x' &= x - d_{rc} \sin \Omega \\ z' &= z - d_{rp} d_{rc} \cos \Omega \end{aligned} \quad [9]$$

The rotation by $\Omega$ about the y axis produces:

$$\begin{aligned} x' &= x \cos \Omega - z \sin \Omega \\ z' &= x \sin \Omega + z \cos \Omega \end{aligned} \quad [10]$$

Combining the translation and then the rotation produces:

$$\begin{aligned} x' &= x \cos \Omega - z \sin \Omega - d_{rc} \sin \Omega \\ z' &= x \sin \Omega + z \cos \Omega + d_{rc} \cos \Omega - d_{rp} \end{aligned} \quad [11]$$

This is the transformation needed when the system is perfectly aligned. This has been verified for the special cases of fly $\Omega_y = 0°, \pm 90°$, and $180°$.

Instead of looking at the case of a perfectly aligned projector 27 as done for equation 8, the more general case of translation and rotation in all three axes follows:

$$x' = x[\cos\Omega_y \cos\Omega_z - \sin\Omega_x \sin\Omega_y \sin\Omega_z] + \quad [12]$$
$$y[\cos\Omega_y \sin\Omega_z + \sin\Omega_x \sin\Omega_y \cos\Omega_z] -$$
$$z[\cos\Omega_x \sin\Omega_y] - d_{rc} \sin\Omega_y$$

$$y' = -x[\cos\Omega_x \sin\Omega_z] +$$
$$y[\cos\Omega_x \cos\Omega_z] +$$
$$z[\sin\Omega_x] + \Delta_y$$

$$z' = x[\sin\Omega_y \cos\Omega_z + \sin\Omega_x \cos\Omega_y \sin\Omega_z] +$$
$$y[\sin\Omega_y \sin\Omega_z - \sin\Omega_x \cos\Omega_y \cos\Omega_z] +$$
$$z[\cos\Omega_x \cos\Omega_y] + d_{rc} \cos\Omega_y - d_{rp}$$

Substituting equation 12 back into equation 8 now gives:

$$\frac{\begin{Bmatrix} x(t)[\cos\Omega_y \cos\Omega_z - \sin\Omega_x \sin\Omega_y \sin\Omega_z] + \\ y(t)[\cos\Omega_y \sin\Omega_z + \sin\Omega_x \sin\Omega_y \cos\Omega_z] - \\ z(t)[\cos\Omega_x \sin\Omega_y] - d_{rc}\sin\Omega_y \end{Bmatrix}}{(x_p + \Delta x(t))\cos\theta_y} = \quad [13]$$

$$\frac{\begin{Bmatrix} -x(t)[\cos\Omega_x \sin\Omega_z] + \\ y(t)[\cos\Omega_x \cos\Omega_z] + z(t)[\sin\Omega_x] + \Delta y \end{Bmatrix}}{(t + \Delta y(t))\cos\theta_x + (x_p + \Delta x(t))\sin\theta_x \sin\theta_y} =$$

$$\frac{\begin{Bmatrix} x(t)[\sin\Omega_y \cos\Omega_z + \sin\Omega_x \cos\Omega_y \sin\Omega_z] + \\ y(t)[\sin\Omega_y \sin\Omega_z - \sin\Omega_x \cos\Omega_y \cos\Omega_z] + \\ z(t)[\cos\Omega_x \cos\Omega_y] + d_{rc}\cos\Omega_y - d_{rp} \end{Bmatrix}}{(t + \Delta y(t))\sin\theta_x - (x_p + \Delta x(t))\cos\theta_x \sin\theta_y - f_p}$$

Solving for Intersection

Substituting equation 3 into the above and eliminating x and z gives:

$$\frac{y(t)\begin{Bmatrix} x_c[\cos\Omega_y \cos\Omega_z - \sin\Omega_x \sin\Omega_y \sin\Omega_z] + \\ y_c[\cos\Omega_y \sin\Omega_z + \sin\Omega_x \sin\Omega_y \cos\Omega_z] - \\ z_c[\cos\Omega_x \sin\Omega_y] \end{Bmatrix} - y_c d_{rc}\sin\Omega_y}{(x_p + \Delta x(t))\cos\theta_y} \quad [14]$$

$$\frac{y(t)\begin{Bmatrix} -x_c[\cos\Omega_x \sin\Omega_z] + \\ y_c[\cos\Omega_x \cos\Omega_z] + z_c[\sin\Omega_x] \end{Bmatrix} + y_c \Delta y}{(t + \Delta y(t))\cos\theta_x + (x_p + \Delta x(t))\sin\theta_x \sin\theta_y} =$$

$$\frac{y(t)\begin{Bmatrix} x_c[\sin\Omega_y \cos\Omega_z + \sin\Omega_x \cos\Omega_y \sin\Omega_z] + \\ y_c[\sin\Omega_y \sin\Omega_z - \sin\Omega_x \cos\Omega_y \cos\Omega_z] + \\ z_c[\cos\Omega_x \cos\Omega_y] \end{Bmatrix} + y_c d_{rc}\cos\Omega_y - y_c d_{rp}}{(t + \Delta y(t))\sin\theta_x - (x_p + \Delta x(t))\cos\theta_x \sin\theta_y - f_p}$$

There are two unknowns, y and t, for these two equations. These equations can be further simplified by making the following substitutions:

$a_1 = x_c[\cos\Omega_y \cos\Omega_z - \sin\Omega_x \sin\Omega_y \sin\Omega_z] + y_c[\cos\Omega_y \sin\Omega_z + \sin\Omega_x \sin\Omega_y \cos\Omega_z] + z_c[\cos\Omega_x \sin\Omega_y]$ $c_1 = -d_{rc} \sin\Omega_y$ $d_1 = (x_p + \Delta x(t)) \cos\theta_y$ $a_2 = -x_c[\cos\Omega_x \sin\Omega_z] + y_c[\cos\Omega_x \cos\Omega_z] + z_c[\sin\Omega_x]$ $b_2 = \cos\theta_x$ $c_2 = \Delta_y$ $d_2 = \Delta y(t) \cos\theta_x + (x_p + \Delta x(t)) \sin\theta_x \sin\theta_y$ $a_3 = x_c[\sin\Omega_y \cos\Omega_z + \sin\Omega_x \cos\Omega_y \sin\Omega_z] + y_c[\sin\Omega_y \sin\Omega_z - \sin\Omega_x \cos\Omega_y \cos\Omega_z] + z_c[\cos\Omega_x \cos\Omega_y]$ $b_3 = \sin\theta_x$ $c_3 = d_{rc} \cos\Omega_y - d_{rp}$ $d_3 = \Delta y(t) \sin\theta_x - (x_p + \Delta x(t)) \cos\theta_x \sin\theta_y - f_p \quad [15]$ to give equations 14 in the following form:

$$\frac{a_1 y(t) + c_1 y_c}{d_1} = \frac{a_2 y(t) + c_2 y_c}{b_2 t + d_2} = \frac{a_3 y(t) + c_3 y_c}{b_3 t + d_3} \quad [16]$$

Using parts 1 and 2 of equation 16 to find y in terms of t:

$$\frac{a_1 y + c_1 y_c}{d_1} = \frac{a_2 y + c_2 y_c}{b_2 t + d_2} \quad [17]$$

$(a_1 y + c_1 y_c)(b_2 t + d_2) = d_1(a_2 y + c_2 y_c)$ $a_1 d_2 y + c_1 d_2 y_c + a_1 b_2 t y + c_1 b_2 t y_c = a_2 d_1 y + c_2 d_1 y_c$ $y(a_1 d_2 + a_1 b_2 t - a_2 d_1) = c_2 d_1 y_c - c_1 d_2 y_c - c_1 b_2 t y_c$ $$y = y_c \frac{c_2 d_1 - c_1(b_2 t + d_2)}{a_1(b_2 t + d_2) - a_2 d_1}$$

And combining with equation 3 gives the full solution for a surface coordinate $(x_s, y_s, z_s)$ as follows:

$$x_s = x_c \frac{c_2 d_1 - c_1(b_2 t + d_2)}{a_1(b_2 t + d_2) - a_2 d_1} \quad [18]$$

$$y_s = y_c \frac{c_2 d_1 - c_1(b_2 t + d_2)}{a_1(b_2 t + d_2) - a_2 d_1}$$

$$z_s = z_c \frac{c_2 d_1 - c_1(b_2 t + d_2)}{a_1(b_2 t + d_2) - a_2 d_1}$$

The expression for t is found by combining all three parts of equation 16 as follows:

$q_2 = (d_2 + b_2 t) \quad [19]$ $q_3 = (d_3 + b_3 t)$ $$y = y_c \frac{c_2 d_1 - c_1 q_2}{a_1 q_2 - a_2 d_1}$$

$$\frac{a_2 y + c_2 y_c}{q_2} = \frac{a_3 y + c_3 y_c}{q_3}$$

$$\frac{a_2 \frac{c_2 d_1 - c_1 q_2}{a_1 q_2 - a_2 d_1} + c_2}{q_2} = \frac{a_3 \frac{c_2 d_1 - c_1 q_2}{a_1 q_2 - a_2 d_1} + c_3}{q_3}$$

$$a_2 q_3 \frac{c_2 d_1 - c_1 q_2}{a_1 q_2 - a_2 d_1} + c_2 q_3 = a_3 q_2 \frac{c_2 d_1 - c_1 q_2}{a_1 q_2 - a_2 d_1} + c_3 q_2$$

$a_2 q_3(c_2 d_1 - c_1 q_2) + c_2 q_3(a_1 q_2 - a_2 d_1) = a_3 q_2(c_2 d_1 - c_1 q_2) +$ $c_3 q_2(a_1 q_2 - a_2 d_1) - a_2 q_3 c_1 + a_1 c_2 q_3 = a_3 c_2 d_1 - a_3 c_1 q_2 + a_1 c_3 q_2 -$ $a_2 c_3 d_1 - a_2 c_1(d_3 + b_3 t) + a_1 c_2(d_3 + b_3 t) = a_3 c_2 d_1 - a_3 c_1(d_2 + b_2 t) +$ $a_1 c_3(d_2 + b_2 t) - a_2 c_3 d_1 - a_2 c_1 d_3 - a_2 c_1 b_3 t + a_1 c_2 d_3 + a_1 c_2 b_3 t =$ $a_3 c_2 d_1 - a_3 c_1 d_2 - a_3 c_1 b_2 t + a_1 c_3 d_2 + a_1 c_3 b_2 t - a_2 c_3 d_1$ $t(-a_2 c_1 b_3 + a_1 c_2 b_3 + a_3 c_1 b_2 - a_1 c_3 b_2) =$ $a_3 c_2 d_1 - a_3 c_1 d_2 + a_1 c_3 d_2 - a_2 c_3 d_1 + a_2 c_1 d_3 - a_1 c_2 d_3$ $$t = \frac{a_1 c_3 d_2 - a_1 c_2 d_3 + a_2 c_1 d_3 - a_2 c_3 d_1 + a_3 c_2 d_1 - a_3 c_1 d_2}{a_1 c_2 b_3 - a_1 c_3 b_2 + a_3 c_1 b_2 - a_2 c_1 b_3}.$$

The calculation of the surface coordinates $(x_s, y_s, z_s)$ is accomplished by computing the substitution values of equations 15, and the value for t in equation 19; and applying these values to the coordinate equations 18.

Since t is also contained within the distortion terms $d_1, d_2, d_3$ in equations 15, an iterative solution is required. In the first iterative step, zero distortion is assumed, the parameters in equations 15 are calculated, and a value for t in equation 19 is then found. These values are used to find estimates for x and y. The t in equation 19 is then recalculated. When large amounts of distortion are present, additional iterative steps may be needed.

Finally, the values for the surface coordinates $(x_s, y_s, z_s)$ in equation 18 are calculated using the final values from equations 15 and 19.

Phase Unwrapping

In the preferred embodiment, the phases are unwrapped within computer 47 before being inserted into the above equations. In the raw phase map, there are periodic discontinuities across the surface 79, because the computed phase is modulo one fringe width (fringe period of 360°). The phase unwrapping process restores the integer wave portion to the phase, thus removing these discontinuities across surface 79.

In the preferred embodiment, the unwrapping method is a method called ordered phase unwrapping, which applies a quality metric to each pixel in the image, to rank pixels for the order in which they will be unwrapped. A preferred quality metric is:

$$Q_n = -\log\left[\left(\frac{1}{s_n + s_t}\right)^2 \Sigma \left(\frac{\phi_i + |\phi_n - \phi_i|}{s_1 + s_t}\right)^2\right] - r_i r_w + d_i d_w$$

where:

$s_n, s_i$ are the signal-to-noise ratios for the nth and ith pixels, $s_t$ is the tolerance for the signal to noise ratios, $\phi_n, \phi_i$ are the phases for the nth and ith pixels, $s_t$ is the tolerance for the phase differences, $r_i$ is the radius from the center of the image, $r_w$ is the radius weighting, $d_i$ is the distance from the nearest inconsistent point or defect, and $d_w$ is the defect weighting.

This quality metric contains a mixture of the modulation intensity (signal-to-noise ratio), the phase deviation between neighboring pixels (with or without disparity gradient constraints), and geometric information such as distance of that particular pixel from image center, inconsistent pixels, or branch cuts and obscurations. Pixels close to the image center are given greater weight than pixels distant from the image center. The parameters $(s_t, \phi_t, r_w, d_w)$ allow weighting the difference components of the quality metric.

The unwrap processing begins by selecting one or more highly ranked pixels initially and then progressing down an ordered list of pixels using the following procedure:

First, the pixel at the top of the ordered list (i.e., having the highest value of quality metric) is unwrapped and removed from the list. Said pixel is unwrapped by changing its integer value (leaving the fractional portion unchanged), so that its phase value is within one half wavelength of the average phase of any unwrapped neighbors.

Second, pixels that abut the above-mentioned pixel and have not yet been unwrapped are added to the ordered list according to their quality metric.

Third, the above two steps are repeated until all the pixels have been unwrapped.

Blending

The blending step is an optional step. If performed, it is performed prior to the phase unwrapping step.

Many objects 20 to be measured optically reflect over a large range of intensity due to reflectivity variations and the high specularity of their surfaces 79. For such objects 20, the present invention preferentially uses a specially developed blending method to acquire multiple exposures of image data and to select the "best" phase over all exposures for each pixel, to achieve a high-quality image exposure. As part of the phase calculation processing, the signal-to-noise ratio W (modulation) of each pixel is computed. The "best" phase for each pixel is then defined as the phase from that exposure in which the modulation for that pixel is the highest. Similarly, other measures of "best" can be used, such as the quality metric described above in conjunction with phase unwrapping, or some subset of said quality metric.

As a further (optional) refinement of the blending step, thresholds can be used. For example, upper and lower thresholds of W can be used: if the measured W is below the lower threshold, the phase for that pixel is not used in subsequent calculations because the data is deemed unreliable; and if the measured W is above the upper threshold, the phase for that pixel is not used in subsequent calculations, because camera 17 may have non-linear response when approaching saturation of its ability to respond to high intensities.

The thresholds can be pre-established as absolute values or as deviations from an optimum value of W or other parameter upon which the threshold is based. Said other parameters can include intensity I, the quality metric described above in conjunction with phase unwrapping, or some subset of said quality metric.

Calculation of Coordinates

Following the calculation of the raw phase map and the unwrapping of the phases, the computed phases are then converted into calculated three-dimensional coordinates by applying the system calibration parameters to each pixel data point, using the system geometry equations discussed above and the results of the calibration procedure discussed below. The finalized image data can then be represented as a fully-dimensioned three-dimensional object that can be measured or viewed on the display of computer 47 in any orientation, using conventional software.

With respect to FIG. 3, a preferred embodiment of projector 27 comprises a lamp 55 that illuminates a light beam through a cold reflector 57 and illuminator optics 59 onto a grating pattern 67 which has been formed, e.g., on a transparent slide 61 that is held in place by slide holder 69 and horizontally translated by a motor 71 that is coupled to a controller connecting to computer 47. The illuminated grating pattern 67 is then projected by projection lens 63 onto object 20.

The requisite phase shifting of the sinusoidal grating pattern 63 is normally achieved by one of two methods. In the first method, the controller commands motor 71 to translate slide holder 69 to three or four desired phase shifts at different times. At each of said times, camera 17 takes an exposure, with one frame of the algorithm corresponding to each exposure. This method is referred to as temporal phase shifting. In the second method, known as spatial phase shifting, slide holder 69 is not physically moved, and camera 17 takes just one exposure. The three or four frames of data are generated by means of computer 47 processing pixels that are approximately 90° and 180° (and, for four-bucket algorithms, 270°) apart from the original set of pixels corresponding to the first frame at 0°. Spatial phase shifting is faster than temporal phase shifting, with a slight loss in resolution. Other phase-shifting techniques are possible.

FIG. 6A illustrates fringe lines 73 projected onto an object 20 whose surface 79 has a flat outer mold line. In this case, object 20 is a model of the outer surface of the United States space shuttle (Space Transportation System) with one of its heat shielding tiles missing. FIG. 6B illustrates the three-dimensional computer depiction 81 of the contour of the missing tile cavity after the present invention has calculated the x, y, and z coordinates thereof. FIG. 6C illustrates the results of applying an additional computer program to depiction 81 to convert the model of the missing tile into a model 83 of a tile which can fill the cavity.

FIGS. 7A, 7B, and 7C correspond to FIGS. 6A, 6B, and 6C, respectively, except that the outer mold line of surface 79 is curved rather than flat.

Calibration Method

FIGS. 8 through 10 illustrate a first embodiment of a test calibration fixture 88 suitable for use in the present invention. The purpose of the calibration fixture 88 is to provide a set of points in three-dimensional space whose coordinates are known very accurately relative to one another. The location of a particular point 93 is determined by measuring three adjacent surfaces 91, then computing their unique intersection point.

The calibration fixture 88 comprises a variety of multi-faceted shapes 90 that are rigidly mounted to a structure 102 to insure their geometrical stability. Test calibration fixture 88 is characterized by a plurality of substantially identical truncated pyramids 90 each having countersunk (92) pins 94.

The fabrication tolerances of the angles and sizes of the surface 91 of shapes 90 are not critical. However, the faces of surfaces 91 must be flat and smooth. Flat surfaces 91 are used, because three or more points measured on each surface 91 can be used to define the plane of the surface 91. The intersection point 93 for three intersecting plane surfaces 91 can then be uniquely determined.

The calibration procedure for the present invention is described below as a six-step process.

1) In the first calibration step, the calibration fixture surface 91 is accurately measured by conventional traceable mechanical methods to establish the three-dimensional locations of many points along the surfaces 91 of the test calibration fixtures 88. The intersection points 93 are then computed. This establishes a line of dimensional traceability between these mechanical measurements and subsequent optical measurements performed by optical elements 17, 19, 27.

2) The second step in the calibration method is to place the test calibration fixture 88 into the field of view of the optical elements 17, 19, 27. The mathematical derivation presented above assumes that maximum sensitivity will occur when the fringe lines 73 are oriented vertically, and minimum sensitivity will occur when said fringe lines 73 are oriented horizontally.

3) The third step in the method for calibrating the optical system of the present invention is to perform the optical measurements on the test calibration fixture 88 to get a set of phases for each of a plurality of pixels $x_0$, $y_0$. These phases are referred to as $x_p$ in the above mathematical derivation. In the preferred embodiment, W, the signal-to-noise ratio, is also obtained for each pixel. This third step is performed identically to the corresponding step in the operational mode of the present invention (i.e., when measurement device 11 is used to measure any object 20 of interest, and not just a test calibration object 88).

4) Similarly, step 4 in the calibration method is identical to the corresponding step in the operational mode. In step 4, the raw phase map is unwrapped, e.g., using techniques described previously. After the unwrapped phase map has been calculated, the intersections of three plane surfaces are calculated to determine a unique point location in three-dimensional space. For each plane surface, a low order polynomial is fit to the phase data, which may have some curvature. The intersection point of the three surfaces is calculated to produce the phase $x_t$ value, and the camera pixel coordinates $(x_c, y_c)$. This triplet of numbers $(x_c, y_c, x_t)$ is then used in step 5.

5) Similarly, step 5 of the calibration method is identical to the corresponding step in the operational mode: equations 15, 18, and 19 above are used to calculate the three-dimensional coordinates $x_s$, $y_s$, and $z_s$. In order to do this in the calibration mode, as opposed to the operational mode, however, the approximate values of the extrinsic and intrinsic parameters of optical elements 17, 19, 27 must be preselected. These values will be refined during the calibration process described below. The variable $f_c$ is preselected based upon the predetermined value of the focal length of camera 17 (or 19). The variable $f_p$ is based upon the predetermined value of the focal length of projector 27. The variable $d_{rc}$ is the roughly measured distance between point r (the intersection of the projector 27 and camera 17 bore-sights) and camera 17. The variable $d_{rp}$ is the roughly measured distance between r and projector 27. The variable $\Omega_y$ is the roughly measured angle between the boresights of camera 17 and projector 27. All the other small correction parameters are initially set to a value of zero. Said parameters are $\theta_{xc}$, $\theta_{yc}$, $\Delta x_c$, $\Delta y_c$, $\Delta x_p$, $\Delta y_p$, $\theta x_p$, $\theta y_p$, $\Omega_x$, $\Omega_z$, and $\Delta_y$, where the subscript "c" refers to camera 8 and the subscript "p" refers to projector 2.

6) In the sixth step of the calibration method, the above system parameters are varied as the differences between the mechanically measured values of the x,y,z coordinates (from step 1) and the optically measured values of the x,y,z coordinates (from step 5) is minimized in a least squares sense; i.e., the following quantity is minimized:

$$\Sigma[(x_m-x_s)^2+(y_m-y_s)^2+(z_m-z_s)^2]$$

where the subscript "m" refers to the mechanically measured parameters of coordinates from step 1, and the subscript "s" refers to the optically measured coordinates from step 5.

This minimization is performed by using any non-linear optimization, e.g. grid search, Fletcher-Powell, gradient search, or conjugate gradient.

With the system parameters now determined, the calibration method is now complete.

The values of all of the extrinsic and intrinsic parameters resulting from said minimization are now fixed and are used for all subsequent calculations to convert measurement phase data to coordinate data when optical elements 17, 19, 27 of the present invention are used in the operational mode. If the alignment between the camera 17 and projector 27 optics is changed, bumped, or otherwise misaligned, the calibration method described above must be re-performed.

Referring to FIG. 11, timing sequence 111 shows the sequence of data acquisition by each of the cameras in relation to frame time line 113 with thirtieth-second intervals. Frame line 115 shows a sequence of twenty-four frames grouped in sets of six thirtieth-second intervals 114 with blank frames 115 spaced between each set of six intervals 114. Camera line 117 shows timing for taking three photographs per camera during each set of intervals 114. Cameras 17, 19 are alternately activated at each rising and falling edge and operated with fast, medium and slow shutter speeds during three successive interval pairs of a given interval set 114 as shown in shutter speed line 118. During the first interval set 114, the fringe lines are set with a phase angle of zero degrees and are thereafter incremented by a phase of ninety degrees at the end of each interval set 114 as shown in phase line 119. The blank frames 115 allow time for the mechanical phase shifter to settle before the next photograph is taken.

Referring to FIG. 12, cavity processing flow diagram 201 is shown wherein a data set is either acquired real-time 203 from cameras 17, 19 or from a storage file retrieved 205 upon an open image data set command. Data from the six separate images with the fringe at a given phase is separately extracted 207 for intensity levels 1, 2 and 3. The phase and modulation of each image is separately calculated 209. Data from the images at each of the three intensity levels of each camera are blended according to phase and modulation 211. The data is then unwrapped with respect to phase 213. From the blended data of the left and right cameras 17, 19, the spatial position of each pixel is calculated 215, 216 in the XYZ coordinate system. For the left and right cameras, the surface normals of the image are calculated 217, 225 using the spatial information and the cavity surfaces (sidewalls, Inner Mold Line (IML), Outer Mold Line (OML)) are labelled 219, 227. The spatial information of the left camera and the cavity right camera are combined and the surfaces are fitted 229 with planes (sidewalls) or polynomials (IML and OML). From the combined image, an IGES file is created 231.

Referring to FIG. 13, a flowchart of the program initialization 301 is shown. Upon activating start-up software XView 303, menus are created 305 on the display of the console of computer 47 and on display 45. Data arrays are allocated 307 in storage for receipt of image data. Calibration files are loaded 309 from storage. The release number of the activated display software is displayed 311. The console prompts 313 the user for the tool 11 identification number or displays the identification number of the default tool 11. The frame grabber is initialized 315. The digital input/output is initialized 317. The video display is cleared 319. The projector is set and the illumination turned off 321. The phase of the fringe is set to zero degrees 323. The TCMS window is displayed 325 on the console. The main console menu is displayed 327. The event loop is commenced 329 giving the operator access to the menus and displays controlled by the TCMS program. When the operator selects the quit button, the termination software operates according to the quit flow chart 351. Upon initiating a quit operation, the hardware is reset to initial conditions 353. The data arrays are released and the event loop is exited 355.

Referring to FIG. 14, the TCMS main menu 401 displayed on the console of computer 47 is shown to include various operating options selectable by a console user to control the operation of tool 11. The options include file selection and manipulation 303, tool 11 calibration 405, tile data measurement 407, display of data or an image 409, and diagnostic selections 411.

Referring to FIG. 15, the remote tool 11 menu 501 displayed on display 45 of tool 11 is shown to include various operating options selectable by the user of tool 11 after the console operator transfers control through the remote option under measurement menu 407. The options are selectable with thumb buttons 50, 51 and activatable with trigger 49 of tool 11. The options include image capture selection 503, review captured image selection 505, view live video selection. 507, and store data selection 509.

The present invention has been described above in terms of particular embodiments. However, other embodiments within the scope of the invention would become apparent to practitioners skilled in the art upon perusal of the foregoing specification and accompanying drawings. All specifications as to weight, size, model et cetera are understood to be with reference to a preferred embodiment and not to be limiting to the inventor. It may further be appreciated that a single camera 17, 19 may be placed centrally over object 20 with dual projectors 27 placed about the cameras 17, 19. Accordingly, the invention is defined more generally by the claims and their equivalents.

What is claimed is:

1. A portable image processing device for obtaining a three-dimensional image of a spatial region with at least one feature from two-dimensional image data, said image processing device comprising:

a projector for developing a projected pattern within a spatial region, the projector including a translation stage for translating the projected pattern to different locations along an axis within the spatial region, the projected pattern including a distortion associated with the feature, the distortion being a function of the different locations; and a first optical sensor for obtaining two-dimensional image data of the spatial region along with the projected pattern at each of the different locations and transmitting the image data for subsequent combining to develop a three-dimensional image based upon measurable differences between the distortions associated with the feature, said device further comprising:

a base plate for fixing the sensor in relation to the projector;

a housing with apertures enclosing the base plate, the sensor and projector, each of the apertures associated with the sensor and projector, the housing including at least one handle for positioning the device in relation to the spatial region; and a hood extending outwardly from the housing for darkening a volume between the spatial region and the sensor and the projector.

2. A portable image processing device for obtaining a three-dimensional image of a spatial region with at least one feature from two-dimensional image data, said image processing device comprising:

a projector for developing a projected pattern within a spatial region, the projector including a translation stage for translating the projected pattern to different locations along an axis within the spatial region, the projected pattern including a distortion associated with the feature, the distortion being a function of the different locations; and a first optical sensor for obtaining two-dimensional image data of the spatial region along with the projected pattern at each of the different locations and transmitting the image data for subsequent combining to develop a three-dimensional image based upon measurable differences between the distortions associated with the feature, the device further comprising:

a positioning handle connecting to the optical sensor and projector for positioning the device within a field of view of the optical sensor and projector, the positioning handle including a selection portion for selecting an operating mode from a set of modes; and an activating portion for activating the optical sensor; and a display connecting to the handle for displaying an image of the spatial region within the field of view.

3. An image processing system for obtaining a three-dimensional image of a spatial region with at least one feature, said image processing system comprising:

a hand-held imaging device including a projector for developing a projected pattern within said spatial region, the projected pattern including a distortion associated with the feature;

first and second electronic cameras for sequentially obtaining digital image data of the spatial region with the projected pattern; and a housing connecting to the projector and cameras for fixing respective positions and fields of view of the projector and cameras; and a processor connecting to the projector and cameras for controlling operation of the projector and cameras, interpreting the image data, and obtaining a three-dimensional image based upon the distortion, the device further comprising:

a positioning handle connecting to the cameras and projector for positioning the device within a field of view of the cameras and projector, the positioning handle including a selection portion for selecting an operating mode from a set of modes, and an activating portion for activating the cameras; and a display connecting to the handle for displaying an image of the spatial region within the field of view of each camera.

4. An image processing system for obtaining a three-dimensional image of a spatial region with at least one feature, said image processing system comprising:

a hand-held imaging device including a projector for developing a projected pattern within said spatial region, the projected pattern including a distortion associated with the feature;

first and second electronic cameras for sequentially obtaining digital image data of the spatial region with the projected pattern; and a housing connecting to the projector and cameras for fixing respective positions and fields of view of the projector and cameras; and a processor connecting to the projector and cameras for controlling operation of the projector and cameras, interpreting the image data, and obtaining a three-dimensional image based upon the distortion, said device further comprising:

a base plate for fixing the cameras in relation to the projector;

a housing with apertures enclosing the base plate, the cameras and projector, each of the apertures associated with a respective one of the cameras and projectors, the housing including at least one handle for positioning the device in relation to the spatial region; and a hood extending outwardly from the housing for darkening a volume between the spatial region and the cameras and the projector.

\* \* \* \* \*